(12) United States Patent
Georgakopoulos

(10) Patent No.: US 11,190,055 B2
(45) Date of Patent: Nov. 30, 2021

(54) SIMULTANEOUS WIRELESS POWER AND DATA TRANSFER SYSTEM

(71) Applicant: Stavros Georgakopoulos, Miami, FL (US)

(72) Inventor: Stavros Georgakopoulos, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/013,144

(22) Filed: Sep. 4, 2020

(65) Prior Publication Data

US 2021/0143678 A1 May 13, 2021

Related U.S. Application Data

(62) Division of application No. 16/677,196, filed on Nov. 7, 2019, now abandoned.

(51) Int. Cl.
| | |
|---|---|
| *H02J 50/12* | (2016.01) |
| *H04B 5/00* | (2006.01) |
| *H02J 50/50* | (2016.01) |
| *H01F 38/14* | (2006.01) |
| *H02J 50/80* | (2016.01) |

(52) U.S. Cl.
CPC ............. *H02J 50/12* (2016.02); *H01F 38/14* (2013.01); *H02J 50/50* (2016.02); *H02J 50/80* (2016.02); *H04B 5/0037* (2013.01)

(58) Field of Classification Search
CPC .. H02J 50/00; H02J 50/12; H02J 50/50; H02J 50/80; H04B 5/00

USPC ........................................................ 307/104
See application file for complete search history.

(56) References Cited

U.S. PATENT DOCUMENTS

| | | | |
|---|---|---|---|
| 9,799,443 B2 | 10/2017 | Georgakopoulos et al. | |
| 9,985,460 B2 | 5/2018 | Georgakopoulos et al. | |
| 10,038,345 B1 | 7/2018 | Georgakopoulos et al. | |
| 10,291,076 B2 | 5/2019 | Georgakopoulos | |
| 10,636,563 B2 | 4/2020 | Peralta et al. | |
| 10,873,221 B1 * | 12/2020 | Pierquet | H02J 7/025 |
| 2013/0069748 A1 | 3/2013 | Singh et al. | |
| 2013/0241697 A1 | 9/2013 | Baumert et al. | |
| 2014/0327320 A1 | 11/2014 | Muhs et al. | |
| 2015/0222129 A1 | 8/2015 | McCauley et al. | |
| 2016/0012515 A1 | 1/2016 | Cronin et al. | |

(Continued)

*Primary Examiner* — Adi Amrany
(74) *Attorney, Agent, or Firm* — Saliwanchik, Lloyd & Eisenschenk

(57) ABSTRACT

A wireless power and data transfer system including a transmitter and a receiver is provided for wirelessly transmitting power from a transmitter to a receiver and wirelessly transmitting data from the receiver to the transmitter. The transmitter comprises a transmitter substrate, a source element forming an inner loop on the transmitter substrate, a plurality of transmitter resonator elements each forming an outer loop on the transmitter substrate; and a plurality of transmitter capacitors connected to the plurality of transmitter resonator elements, respectively. The receiver comprises a receiver substrate, a load element forming an inner loop on the receiver substrate, a plurality of receiver resonator elements each forming an outer loop on the receiver substrate; and a plurality of receiver capacitors connected to the plurality of receiver resonator elements, respectively.

9 Claims, 34 Drawing Sheets

(56) References Cited

U.S. PATENT DOCUMENTS

| | | | |
|---|---|---|---|
| 2016/0094041 A1* | 3/2016 | Aioanei | H02J 5/005 |
| | | | 307/104 |
| 2016/0094398 A1* | 3/2016 | Choudhury | H04L 45/42 |
| | | | 370/254 |
| 2016/0105036 A1 | 4/2016 | Raghunathan et al. | |
| 2016/0371776 A1* | 12/2016 | Sato | G06Q 40/04 |
| 2017/0018935 A1* | 1/2017 | Georgakopoulos | H02J 50/12 |
| 2017/0054213 A1 | 2/2017 | Singh et al. | |
| 2017/0063135 A1* | 3/2017 | Sultenfuss | H02J 50/80 |
| 2017/0358955 A1 | 12/2017 | Feng et al. | |
| 2018/0019624 A1 | 1/2018 | Chen | |
| 2018/0063672 A1* | 3/2018 | Krebs | H04W 4/02 |
| 2018/0275246 A1* | 9/2018 | Ma | G01S 13/765 |
| 2018/0289189 A1 | 10/2018 | Lazzi et al. | |
| 2018/0317313 A1* | 11/2018 | Kegeler | H05K 3/429 |
| 2019/0044392 A1* | 2/2019 | Chowdhury | H02J 50/12 |

* cited by examiner

- The CSCMR design parameters are as follows: $r_1 = 14$ mm; $r_2 = 20$ mm; $r_3 = 50$ mm; $w = 4.8$ mm; $d = 50$ mm; $c_1 = 31$ pf; $c_2 = 7.6$ pf and the center operating frequency is 117 MHz ○ Transmitter ● Receiver & Sensors or Devices

SIMULTANEOUS WIRELESS POWER AND DATA TRANSFER SYSTEM

CROSS REFERENCE TO RELATED APPLICATION

The present application is a divisional application of U.S. application Ser. No. 16/677,196, filed Nov. 7, 2019, the disclosure of which is hereby incorporated by reference in its entirety, including all figures, tables, and drawings.

GOVERNMENT SUPPORT

This invention was made with government support under Award Number FA9550-16-1-0145 awarded by the Air Force Office of Scientific Research (AFOSR). The government has certain rights in the invention.

BACKGROUND

Traditional wireless technologies, for powering or charging mobile or other electronic or electric devices, generally use a wireless power transmitter and wireless power receiver in combination, to provide a means for transfer of power across a distance. Even though wireless power transfer (WPT) technology allows wireless power transfer to a receiver, such as one including a sensor, there is a lack of investigations on apparatuses and methods to simultaneously transfer both power and data through a wirelessly coupled transmitter-receiver system.

BRIEF SUMMARY

There continues to be a need in the art for improved designs and techniques for simultaneously and efficiently transfer both power and data. Embodiments of the subject invention pertain to a wireless power and data transfer system simultaneously transmitting power from a transmitter to a receiver and transmitting data from the receiver to the transmitter.

According to an embodiment of the invention, the wireless power and data transfer system can comprise: a transmitter and a receiver; the transmitter configured to wirelessly transmit power to the receiver and wirelessly receive data from the receiver, and the receiver configured to wirelessly transmit the data to the transmitter and wirelessly receive the power from the transmitter; the transmitter comprising a transmitter substrate; a source element forming an inner loop on the transmitter substrate; a plurality of transmitter resonator elements each forming an outer loop on the transmitter substrate, surrounding the inner loop of the source element; and a plurality of transmitter capacitors connected to the plurality of transmitter resonator elements, respectively; and the receiver comprising a receiver substrate; a load element forming an inner loop on the receiver substrate; a plurality of receiver resonator elements each forming an outer loop on the receiver substrate, surrounding the inner loop of the load element; and a plurality of receiver capacitors connected to the plurality of receiver resonator elements, respectively. The inner loop of the source element and each outer loop of the plurality of transmitter resonator elements can be disposed on different layers stacked on the transmitter substrate or the inner loop of the load element and each outer loop of the plurality of receiver resonator elements can be disposed on different layers stacked on the receiver substrate. The system can further comprise at least two transmitter vias penetrating the outer loops of the plurality of transmitter resonator elements to electrically connect the plurality of transmitter resonator elements in parallel; or at least two receiver vias penetrating the outer loops of the plurality of receiver resonator elements to electrically connect the plurality of receiver resonator elements in parallel. The outer loops of the plurality of transmitter resonator elements and the inner loop of the source element can be disposed on a same plane and be concentric. The outer loops of the plurality of receiver resonator elements and the inner loop of the load element can be disposed on a same plane and be concentric. Moreover, the transmitter and the receiver can be disposed on a same plane or the transmitter and the receiver can be disposed in parallel. The transmitter substrate or the receiver substrate can be made of any suitable material such as a glass-reinforced epoxy laminate material (e.g., FR4), a flexible board, cloth, textile or ceramic.

In another embodiment, the wireless power and data transfer system can comprise a transmitter (TX) device and a receiver (RX) device; the TX device comprising a signal converter and a transmitter element configured to wirelessly transmit power to the RX device and wirelessly receive data from the RX device, the received data being provided to the signal converter; the signal converter configured to convert the data provided by the transmitter element for output; and the RX device comprising a power converter; at least one sensor element; a signal modulator; and a receiver element configured to wirelessly receive the power transmitted from the transmitter element of the TX device and wirelessly transmit the data to the transmitter element, the received power being provided to the power converter; the power converter configured to convert the power provided by the receiver element and supply the converted power to the at least one sensor element; the at least one sensor element configured to receive the converted power supplied by the power converter and acquire data, the acquired data being provided to the signal modulator; and the signal modulator configured to modulate the data provided by the at least one sensor element and provide the modulated data to the receiver element. The TX device and the RX device can be configured to transfer power and data with each other by a wireless near-field method. The TX device and RX device can be configured to transfer power or data through strongly coupled magnetic resonance (SCMR). The SCMR can be conformal strongly coupled magnetic resonance (CSCMR). The RX device can comprise a power storage element coupled to the sensor element configured to be charged or recharged by the power received from the receiver element. The signal converter can be an envelope detector. The power transferred between the TX device and the RX device can be radio frequency (RF) power. The signal modulator can be a backscattering modulator.

DETAILED DESCRIPTION

Embodiments of the subject invention provide a wireless power and data transfer system including a transmitter and a receiver for wirelessly transmitting power from the transmitter to the receiver and wirelessly transmitting data from the receiver to the transmitter.

When the term "approximately" or "about" is used herein, in conjunction with a numerical value, it is understood that the value can be in a range of 95% of the value to 105% of the value, i.e. the value can be +/−10% of the stated value. For example, "about 1 kg" means from 0.95 kg to 1.05 kg.

Figure 1:
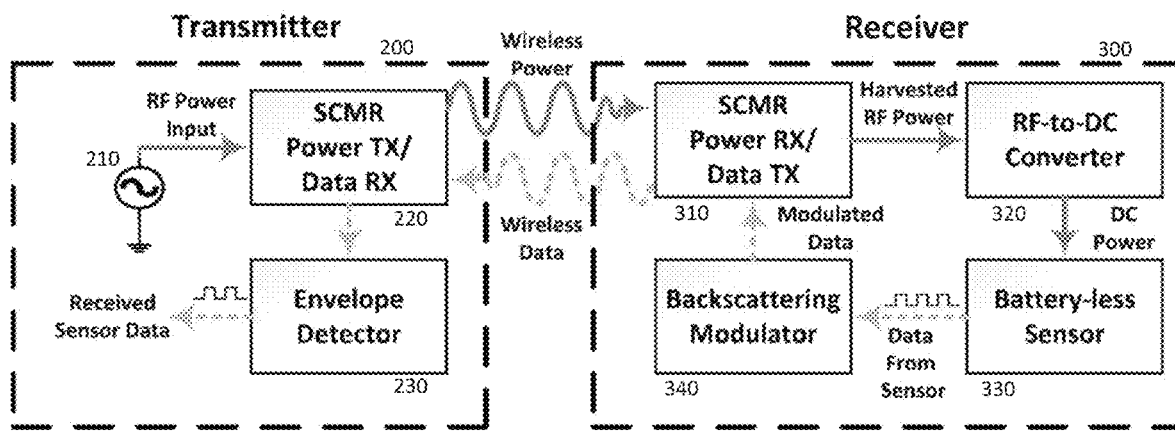
FIG. 1 is a schematic diagram of a wireless power and data transfer system according to an embodiment of the subject invention.

FIG. 1 shows a schematic diagram of a wireless power and data transfer system according to an embodiment of the subject invention. Referring to FIG. 1, the wireless power and data transfer system 100 can comprise a transmitter (TX) device 200 that is wirelessly coupled to a receiver (RX) device 300 for simultaneously transferring power and data with each other.

The transmitter (TX) device 200 can comprise a power input port 210, a signal converter 230 such as an envelope detector, and a transmitter element 220 coupled to the power input port 210 and the signal converter 230. Power such as RF power can be supplied to the transmitter element 220 through the power input port 210.

The RX device 300 can comprise a receiver element 310, a power converter 320 such as a RF-DC power converter coupled to the receiver element 310, at least one sensor element 330 coupled to the power converter 320, and a signal modulator 340 such as a backscattering modulator coupled to the at least one sensor element 330 and the receiver element 310.

As illustrated in FIG. 1, the receiver element 310 is configured to receive the power wirelessly transmitted from the transmitter element 220 and supply the power to the power converter 320 which converts the types of the power. For example, the receiver element 310 harvests RF power from the transmitter element 220 and supplies the RF power to the power converter 320 which converts the RF power to DC power and supplies the DC power to the at least one sensor element 330.

In an embodiment, the at least one sensor element 330 can comprise sensors such as embedded sensors for monitoring structural health of structures including but not limited to, airplanes, cars, bridges, concrete structures; In an embodiment, the at least one sensor element 330 can comprise sensors such as implantable sensors/devices; wearable sensors/devices; soil sensing, and water and ocean sensing.

The at least one sensor element 330 can be powered, charged, or recharged by the power transmitted from the transmitter element 220 to perform data/signal acquisition and to data/signal transmission to the signal modulator 340 which modulates the data/signal received and provides the modulated data/signal to the receiver element 310. The receiver element 310 then is configured to wirelessly transmit the modulated data/signal to the transmitter element 220.

In an embodiment, the TX device 200 and the RX device 300 are configured to wirelessly transfer power and/or data/signal by a wireless near-field method to achieve extra data security beyond encryption, since the data/signal are strong enough to be picked up only in the near vicinity of the TX/RX of the wireless power and data system. Transfer by the wireless near-field method can be such that the amplitude of the data transferred by the wireless near-field method is low and near the noise floor outside the vicinity of the wireless power and data system to maximize data communication security. Thus, the transfer is secure from (interception by) devices external to the system because any device distant from the wireless power and data system cannot detect the data/signal due to the fact that the amplitude of data/signal transferred by wireless near-field methods is fairly low and near the noise floor.

In an embodiment, the TX device 200 and RX device 300 can be configured to transfer power and/or data/signal(s) through strongly coupled magnetic resonance (SCMR) such as conformal strongly coupled magnetic resonance (CSCMR).

Referring back to FIG. 1, when the transmitter element 220 of the TX device 200 receives the wirelessly transferred modulated data/signal from the receiver element 310, the data/signal are supplied to the signal converter 230 which converts the data/signal for displaying or further treatments.

In an embodiment, the TX device 200 and the RX device 300 can be synchronized to simultaneously transfer the power (from the TX device 200 to the RX device 300) and the data (from the RX device 300 to the TX device 200) with each other.

In another embodiment, the TX device 200 and the RX device 300 can be controlled to transfer the power (from the TX device 200 to the RX device 300) and data (from the RX device 300 to the TX device 200) with each other at different time points.

In an embodiment, the RX device 300 can comprise a power storage element (not shown) such as a battery that is configured to be charged or recharged by the power from the TX device 200.

In another embodiment, the RX device 300 can operate without a power storage element such that the RX device 300 can be easily integrated with other sensors/devices to provide battery-free sensing. In this scenario, the operations of the RX device 300 depend on receiving the power from the TX device 200. The integrated RX/sensors can have a long lifetime as they do not rely on batteries for their operations. Therefore, they are suitable for applications involving sensors that once installed then very difficult to access for replacing batteries. Such applications include but not limited to embedded sensors for monitoring structural health of structures such as, airplanes, cars, bridges, concrete structures; implantable sensors/devices; wearable sensors/devices; sensor for soil sensing; sensors for water and ocean sensing.

Figure 2A:
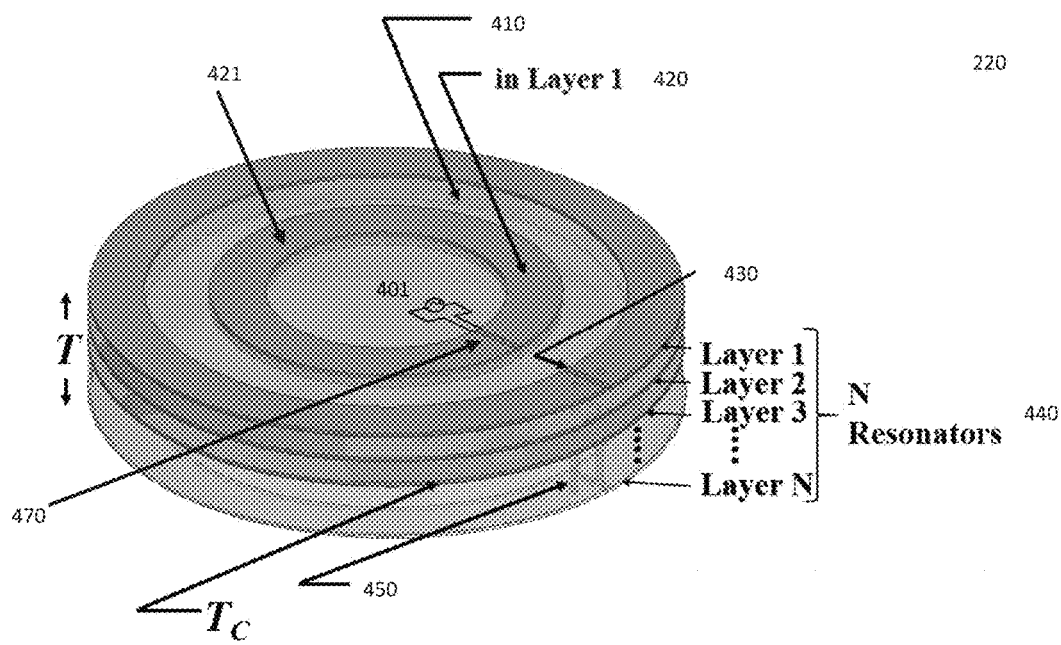
FIG. 2(a) is a schematic diagram of a multi-layer transmitter element of the wireless power and data transfer system according to an embodiment of the subject invention.

FIG. 2(a) shows a schematic diagram of a multi-layer transmitter element of the wireless power and data transfer system according to an embodiment of the subject invention. The multi-layer transmitter element 220 can comprise a transmitter substrate 410, a source element 420 comprising a source 401 and an inner source loop 421 on a surface of the transmitter substrate 410, a plurality of transmitter resonator elements 440 each forming an outer loop on the transmitter substrate 410, and a plurality of transmitter capacitors 430 connected to the plurality of transmitter resonator elements 440, respectively.

Referring to FIG. 2(a), the plurality of transmitter resonator elements 440 is disposed on different layers stacked on the transmitter substrate 410 and the inner source loop 421 is disposed on a layer that is different from the layers that the plurality of transmitter resonator elements 440 are disposed.

In one embodiment, the inner source loop 421 and the plurality of transmitter resonator elements 440 can have a circular shape or other shapes such as rectangular, though embodiments are not limited thereto. Moreover, the outer loops of the plurality of transmitter resonator elements 440 surround the inner source loop 421 and can be concentric with respect to each other and with respect to the inner source loop 421.

In one embodiment, each of the plurality of transmitter capacitors 430 is a lumped capacitor that can be a single capacitor or can be multiple circuit elements (e.g., multiple capacitors) resulting in the capacitance value of the lumped capacitor as discussed herein.

In one embodiment, the circular shape or other shapes of the inner source loop 421 can have disconnected ends 470 that function as an input/output port and are configured to connect to the ends of the source 401, respectively. For example, the inner source loop 421 is formed with a first end and a different second end with the source 401 that couples the first end to the second end.

In one embodiment, the circular shape or other shapes of the transmitter resonator element 440 can have disconnected ends 460 that are configured to connect to the ends of the transmitter capacitors 430, respectively. For example, the transmitter resonator element 440 is formed into a loop having a first end and a different second end with the transmitter capacitor 430 that couples the first end to the second end.

As illustrated in FIG. 2(a), the transmitter element 220 can comprise at least two transmitter vias 450 penetrating the layers of the plurality of transmitter resonator elements 440 to electrically connect the plurality of transmitter resonator elements 440 in parallel. In this case, only one capacitor may be connected to one of the resonators.

In one embodiment, the plurality of transmitter resonator elements 440 is not electrically connected and there are no vias. In this case, each resonator is connected to a capacitor.

In one embodiment, each of the transmitter resonator elements 440 is identical.

In one embodiment, the plurality of transmitter resonator elements 440 has shapes, sizes, materials, parameters, or properties different from each other.

Figure 2B:
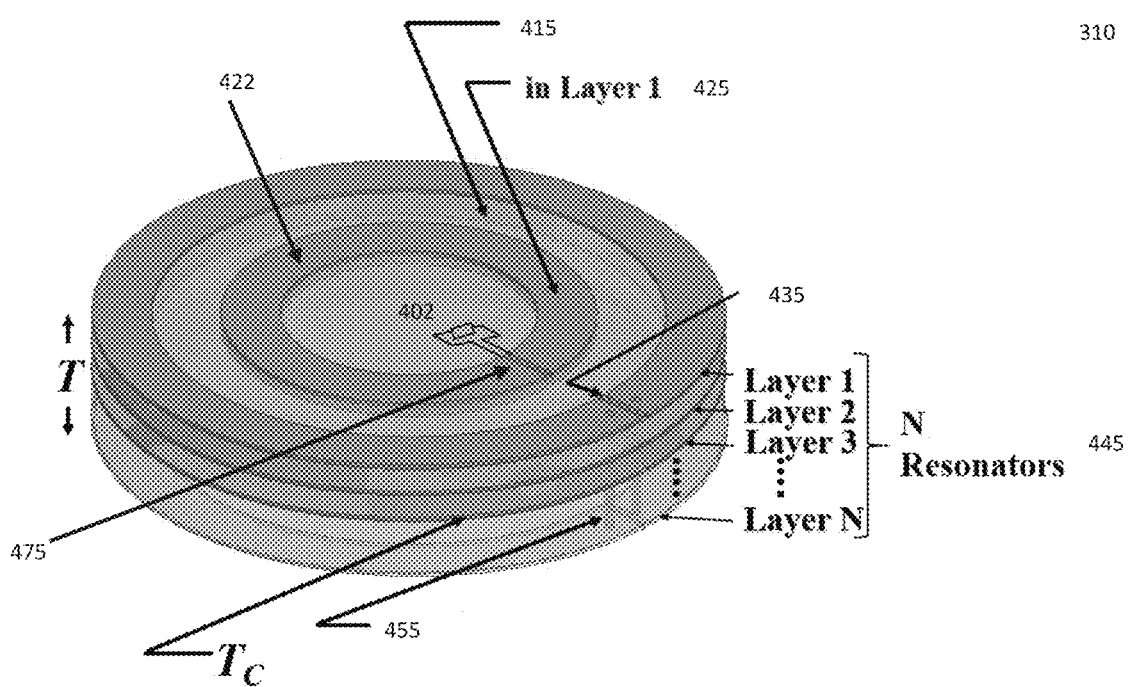
FIG. 2(b) is a schematic diagram of a multi-layer receiver element of the wireless power and data transfer system according to an embodiment of the subject invention.

FIG. 2(b) shows a schematic diagram of a multi-layer receiver element of the wireless power and data transfer system according to an embodiment of the subject invention. The receiver element 310 can comprise a receiver substrate 415, a load element 425 comprising a load 402 and an inner load loop 422 on a surface of the receiver substrate 415, a plurality of receiver resonator elements 445 each forming an outer loop on the receiver substrate 415, and a plurality of receiver capacitors 435 connected to the plurality of receiver resonator elements 445, respectively.

Referring to FIG. 2(b), the plurality of receiver resonator elements 445 is disposed on different layers stacked on the receiver substrate 415 and the inner load loop 422 is disposed on a layer that is different from the layers that the plurality of receiver resonator elements 445 are disposed.

In one embodiment, the inner load loop 422 and the plurality of receiver resonator elements 445 can have a circular shape or other shapes such as rectangular, though embodiments are not limited thereto. Moreover, the outer loops of the plurality of receiver resonator elements 445 surround the inner load loop 422 and can be concentric with respect to each other and with respect to the inner load loop 422.

In one embodiment, each of the plurality of receiver capacitors 435 is a lumped capacitor that can be a single capacitor or can be multiple circuit elements (e.g., multiple capacitors) resulting in the capacitance value of the lumped capacitor as discussed herein.

In one embodiment, the circular shape or other shapes of the inner load loop 422 can have disconnected ends 475 that function as an input/output port and are configured connect to the ends of the load 402, respectively. For example, the inner load loop 422 is formed with a first end and a different second end with the load 402 that couples the first end to the second end.

In one embodiment, the circular shape or other shapes of the receiver resonator element 445 can have disconnected ends 465 that are configured to be connected to the ends of the receiver capacitors 435, respectively. For example, the receiver resonator element 445 is formed into a loop having a first end and a different second end with the receiver capacitor 435 that couples the first end to the second end.

As illustrated in FIG. 2(b), the receiver element 310 can comprise at least two transmitter vias 455 penetrating the layers of the plurality of receiver resonator elements 445 to electrically connect the plurality of receiver resonator elements 445 in parallel.

In one embodiment, the plurality of receiver resonator elements 445 is not electrically connected and there are no vias. In one embodiment, each of the receiver resonator elements 445 is identical.

In one embodiment, the plurality of receiver resonator elements 445 has shapes, sizes, materials, parameters, or properties different from each other.

Furthermore, in FIG. 2(a) or 2(b), a first transmitter or receiver resonator element can be formed on one surface of a substrate (e.g., the top or "front" surface, though this designation is arbitrary), and a second transmitter or receiver resonator can be formed on the opposite surface of the substrate (e.g., the bottom or "rear" surface).

Use of multiple resonator elements allows the wireless power and data transfer system to be tuned to multiple specific frequencies and/or support wideband operation.

Figure 3A:
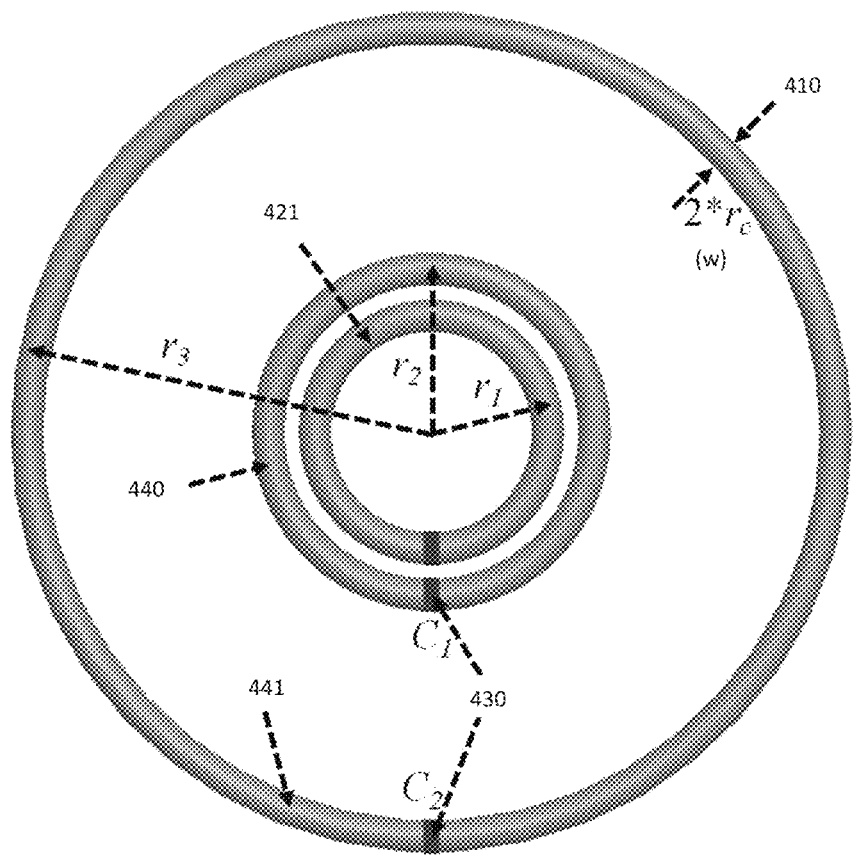
FIG. 3(a) is a schematic diagram of a single-layer transmitter element of the wireless power and data transfer system according to an embodiment of the subject invention.

FIG. 3(a) shows a schematic diagram of a single-layer transmitter element of the wireless power and data transfer system, according to an embodiment of the subject invention. The plurality of transmitter resonator elements 440 and the source element 420 are disposed on a same plane of a surface of the transmitter substrate 410. Moreover, the outer loops of the plurality of transmitter resonator elements 440 surround the inner source loop 421 and can be concentric with respect to each other and with respect to the inner source loop 421.

Referring to FIG. 3(a), the transmitter element 220 can have the inner source loop 421 having a radius r1, a first outer loop 440 of the transmitter resonator elements having a radius r2, and a second outer loop 441 of the transmitter resonator elements having a radius r3, where r1<r2<r3. Moreover, the second outer loops 441 of the transmitter resonator elements can have a cross-sectional width 2*rc or w. Furthermore, a first capacitor of the plurality of transmitter capacitors 430 that is connected to the first outer loop 440 of the transmitter resonator elements can have a capacitance c1 and a second capacitor of the plurality of transmitter capacitors 430 that is connected to the second outer loop 441 of the transmitter resonator elements can have a capacitance c2.

Figure 3B:
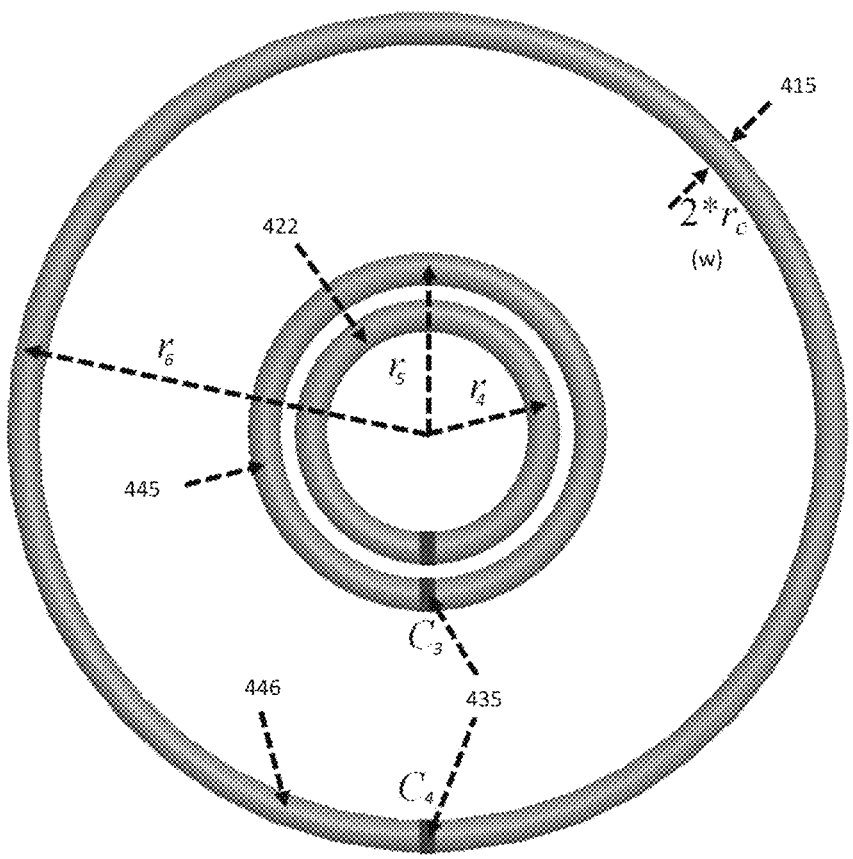
FIG. 3(b) is a schematic diagram of a single-layer receiver element of the wireless power and data transfer system according to an embodiment of the subject invention.

FIG. 3(b) shows a schematic diagram of a single-layer receiver element of the wireless power and data transfer system, according to an embodiment of the subject invention. The plurality of receiver resonator elements 445 and the load element 425 are disposed on a same plane of a surface of the receiver substrate 415. Moreover, the outer loops of the plurality of receiver resonator elements 445 surround the inner load loop 422 and can be concentric with respect to each other and with respect to the inner load loop 422.

Referring to FIG. 3(b), the receiver element 310 can have the inner load loop 422 having a radius r4, a first outer loop 445 of the receiver resonator elements having a radius r5, and a second outer loop 446 of the receiver resonator elements having a radius r6, where r4<r5<r6. Moreover, the second outer loops of the receiver resonator elements 445 can have a cross-sectional width 2*rc or w. Furthermore, a first capacitor of the plurality of receiver capacitors 435 that is connected to the first outer loop 445 of the receiver resonator elements can have a capacitance c3 and a second capacitor of the plurality of receiver capacitors 435 that is connected to the second outer loop 446 of the receiver resonator elements can have a capacitance c4.

In one embodiment, the loops/conductors of the transmitter element 220 or the receiver element 310 can be made of wires, printed conductors in a printed circuit board (PCB), conductive cloth, or conductive threads. In one embodiment, the loops/conductors of the transmitter or the receiver can be made of any conductive material, such as copper, silver, or platinum in any form such as printed conductor, conductive tape, conductive sheet, liquid metal, conductive cloth, or conductive threads.

Figure 4:
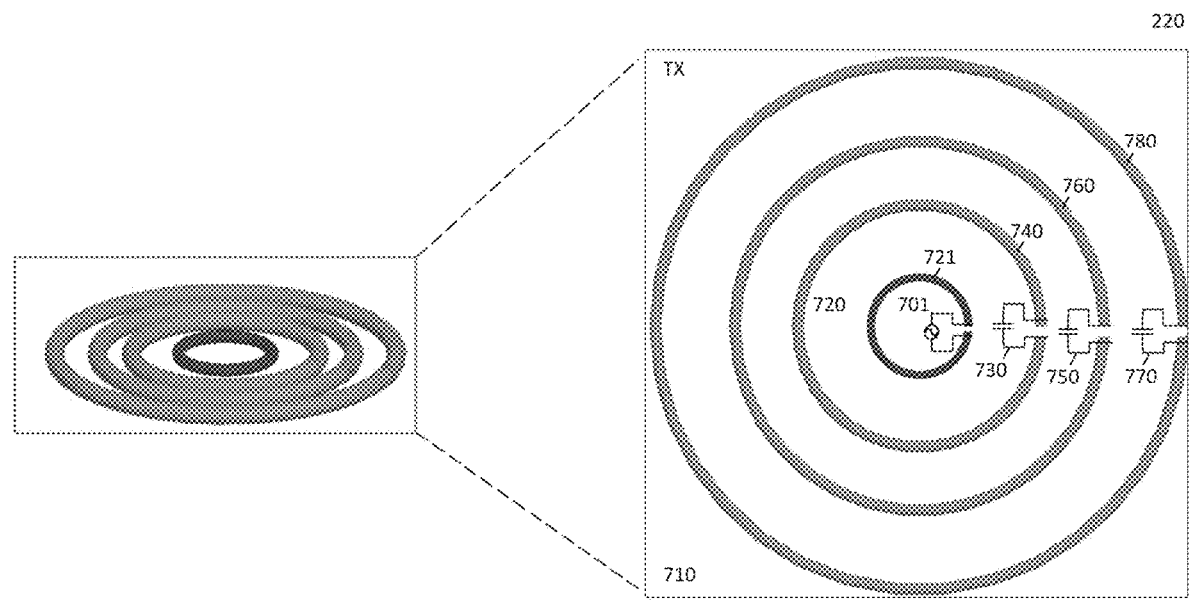
FIG. 4 is a schematic diagram of a schematic diagram of the transmitter element of the wireless power and data transfer system based on strongly coupled magnetic resonance (SCMR) according to an embodiment of the subject invention.

FIG. 4 shows a schematic diagram of the transmitter element of the wireless power and data transfer system based on strongly coupled magnetic resonance (SCMR) according to an embodiment of the subject invention. The transmitter element can comprise a transmitter substrate 710, a source element 720 comprising a source 701 and an inner source loop 721 on a surface of the transmitter substrate 710, a plurality of transmitter resonator elements, for example, 740, 760, and 780, each forming an outer loop on the transmitter substrate 710, and a plurality of transmitter capacitors, for example, 730, 750, and 770, connected to the plurality of transmitter resonator elements 740, 760, and 780, respectively.

In one embodiment, the inner source loop 721 can generate a first periodically fluctuating electromagnetic near field in response to an alternating current received from the source 701. The source element 720 has a Q factor that is at a maximum at its resonant frequency. The plurality of transmitter resonator elements 740, 760, and 780 resonate with first oscillating currents at the first resonant frequency in response to excitation from the periodically fluctuating electromagnetic near field generated by the source element 720.

Figure 5:
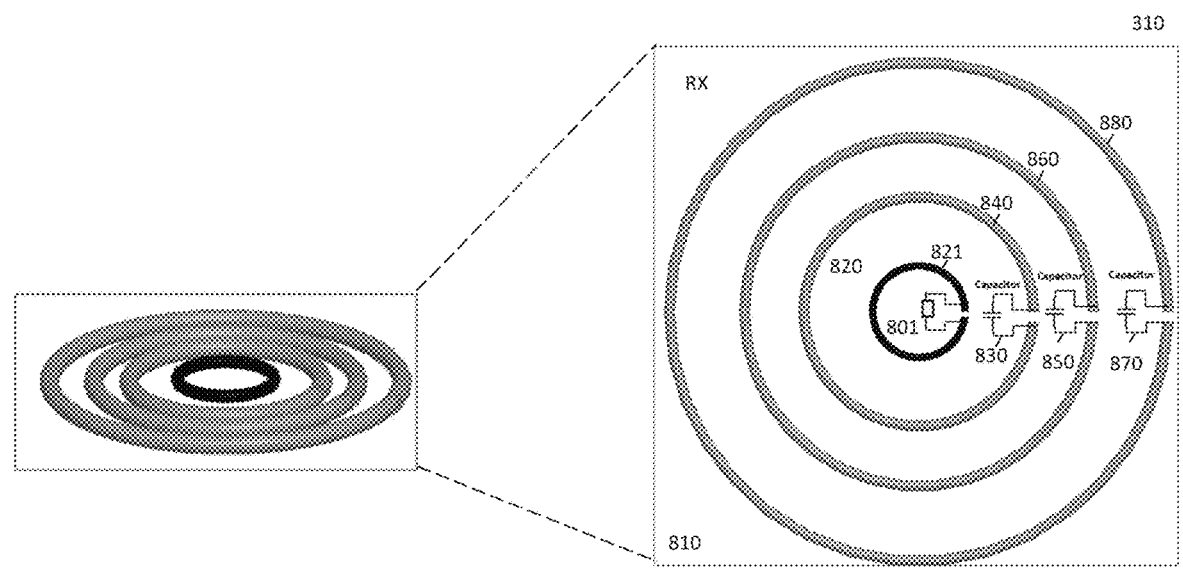
FIG. 5 is a schematic diagram of the receiver element of the wireless power and data transfer system based on strongly coupled magnetic resonance (SCMR) according to an embodiment of the subject invention.

FIG. 5 shows a schematic diagram of the receiver element of the wireless power and data transfer system based on strongly coupled magnetic resonance (SCMR) according to an embodiment of the subject invention. The receiver element can comprise a receiver substrate 810, a load element 820 comprising a load 801 and an inner load loop 821 on a surface of the receiver substrate 810, a plurality of receiver resonator elements, for example, 840, 860, and 880, each forming an outer loop on the receiver substrate 810, and a plurality of receiver capacitors, for example, 830, 850, and 870, connected to the plurality of receiver resonator elements 840, 860, and 880, respectively.

In one embodiment, the load 801 can be a sensor or a device that is configured to be affixed on a body or implanted in the body. The body can be, but is not limited to, a human body, an animal body, or a machine.

In one embodiment, the inner load loop 821 is configured to resonate at the first resonant frequency with a second oscillating current in response to excitation from the source element 720. The receiver resonant elements 840, 860, and 880 generate second periodically fluctuating electromagnetic near field when resonating with the second oscillating current. The inner load loop 821 is electromagnetically coupled to the receiver resonant elements 840, 860, and 880 and generates a current in response to the second periodically fluctuating electromagnetic near field, which is applied to the load 801.

The strongly coupled magnetic resonance (SCMR) is a non-radiative wireless mid-range power transfer method, which in one embodiment is effective for transferring power across a distance of between 10 cm to 300 cm. The SCMR can provide wireless power transfer efficiencies that are significantly higher than the efficiencies of conventional inductive coupling methods. To achieve high efficiency, the transmitting and receiving elements (such as loops or coils) are designed so that they resonate at the desired operational frequency that coincides with the frequency of where the elements exhibit maximum Q-factor. SCMR requires that the TX and RX elements are resonant at the same frequency in order to achieve efficient wireless power and data transfer.

Figure 6:
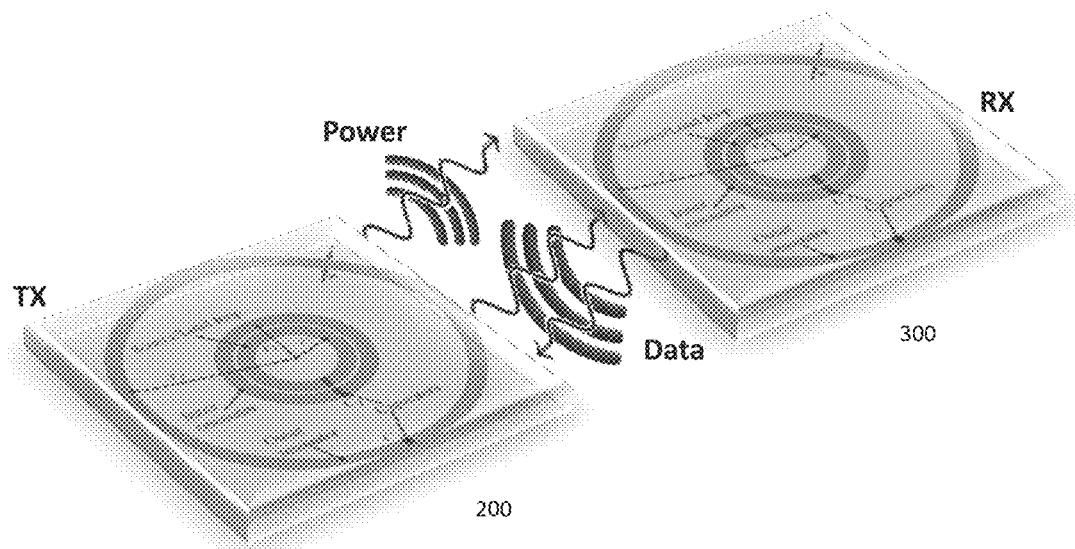
FIG. 6 shows an image of the transmitter element and the receiver element of the wireless power and data transfer system being disposed on a same plane according to an embodiment of the subject invention.

In one embodiment, the transmitter device 200 and the receiver device 300 of the wireless power and data transfer system 100 can be spaced apart and disposed on a same plane as illustrated in FIG. 6.

Figure 7:
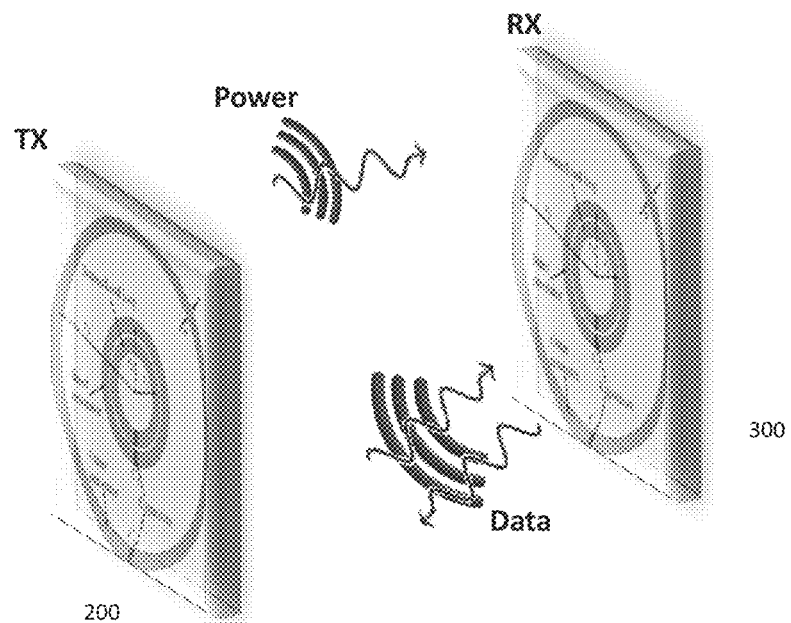
FIG. 7 shows an image of the transmitter element and the receiver element of the wireless power and data transfer system being disposed in parallel according to an embodiment of the subject invention.

In one embodiment, the transmitter device 200 and the receiver device 300 of the wireless power and data transfer system 100 can be spaced apart and disposed in parallel as illustrated in FIG. 7.

Figure 8:
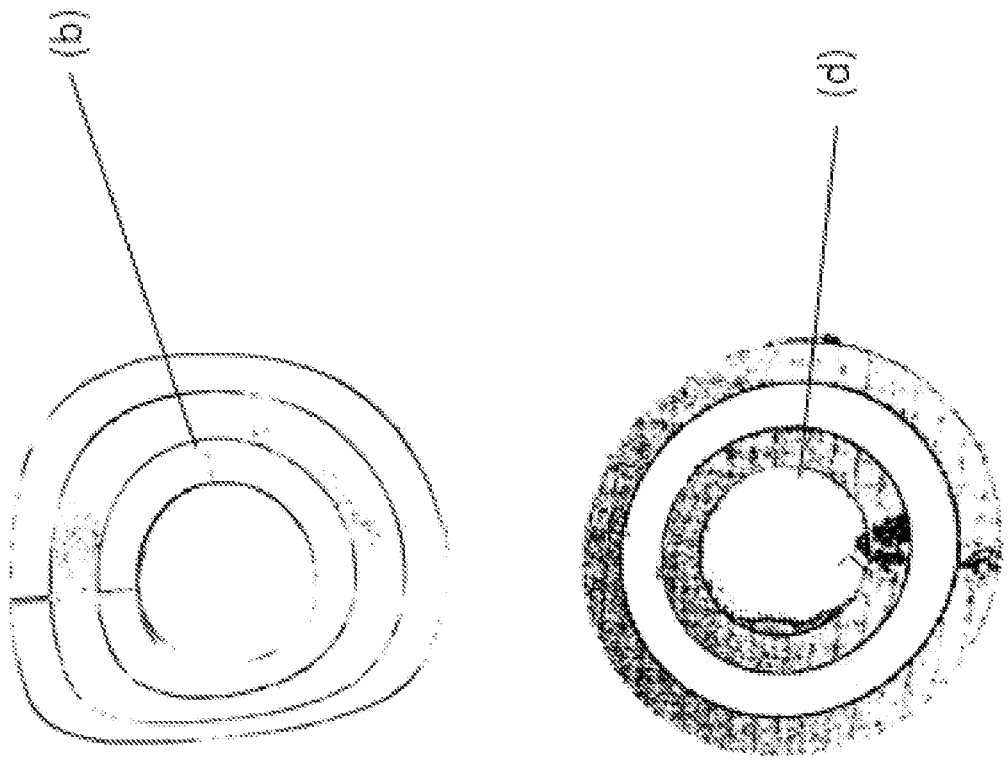
FIG. 8 shows an image illustrating exemplary transmitters or exemplary receivers of the wireless power and data transfer system disposed on substrates made of various materials including (a) standard FR4; (b) a flexible printed circuit board (PCB); (c) textile with conductive threads; and (d) conductive cloth, according to embodiments of the subject invention.
Figure 8:
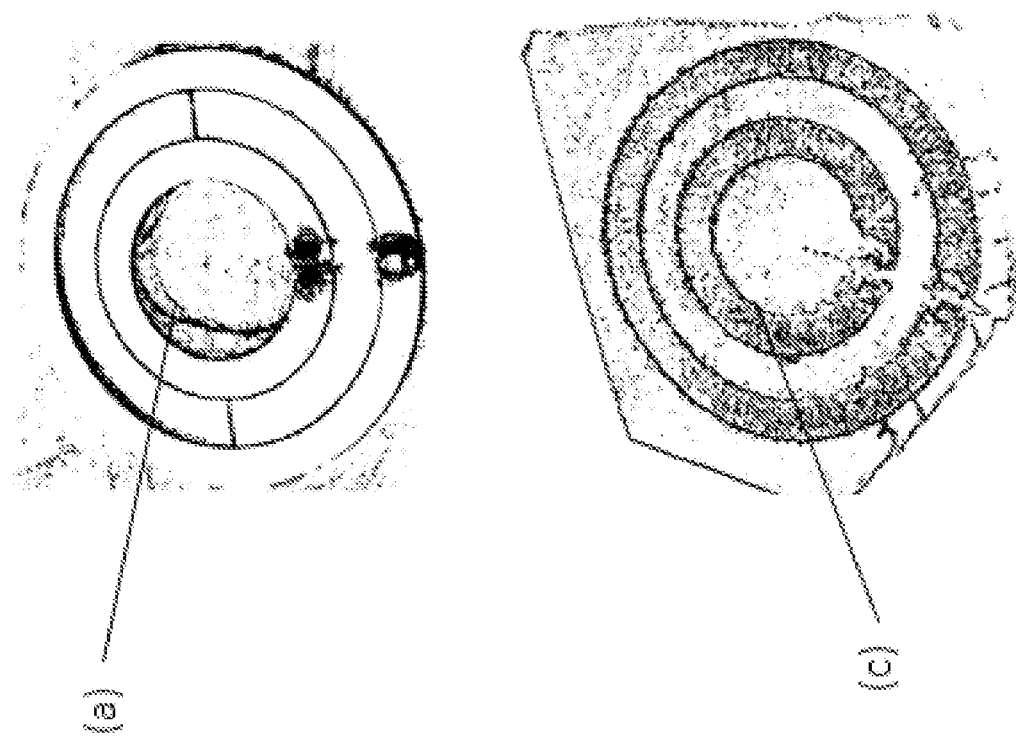

In one embodiment, the wireless power and data transfer system 100 provides the wireless power and data transfer at a same frequency. FIG. 8 shows an image illustrating exemplary transmitters or exemplary receivers of the wireless power and data transfer system disposed on substrates made of various materials including (a) standard FR4 which is a glass-reinforced epoxy laminate material; (b) a flexible printed circuit board (PCB); (c) textile with conductive threads; or (d) conductive cloth, according to an embodiment of the subject invention. These examples are for demonstrative purposes only, and embodiments are not limited thereto.

As illustrated in FIG. 9, the inner source loop and the outer loops of the transmitter resonator elements or the inner load loop and the outer loops of the receiver resonator elements can be made by a conductive material (such as copper wire, conductive cloth, conductive threads) or by conductive ink that is printed on the substrate.

In one embodiment, the loops can be formed by depositing a conductive material on the substrate and then forming the elements through an etching process, or through using conventional lithographic techniques typically employed in circuit applications.

Figure 9A:
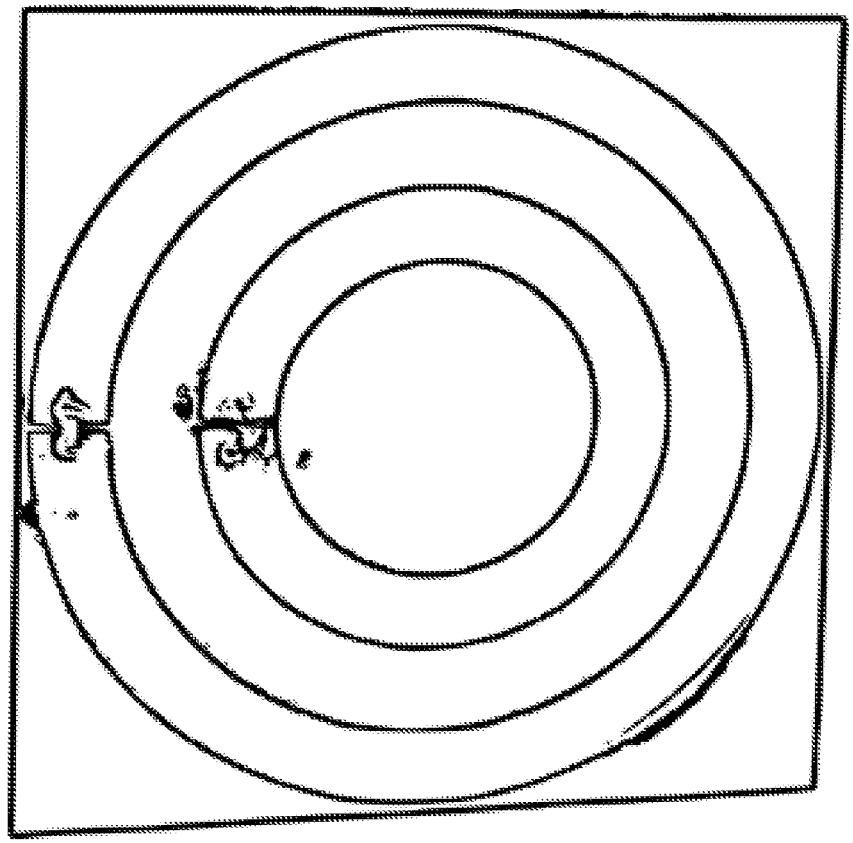
FIG. 9(a) shows a top view of a 12-layer exemplary transmitter or receiver of the wireless power and data transfer system according to an embodiment of the subject invention.
Figure 9B:
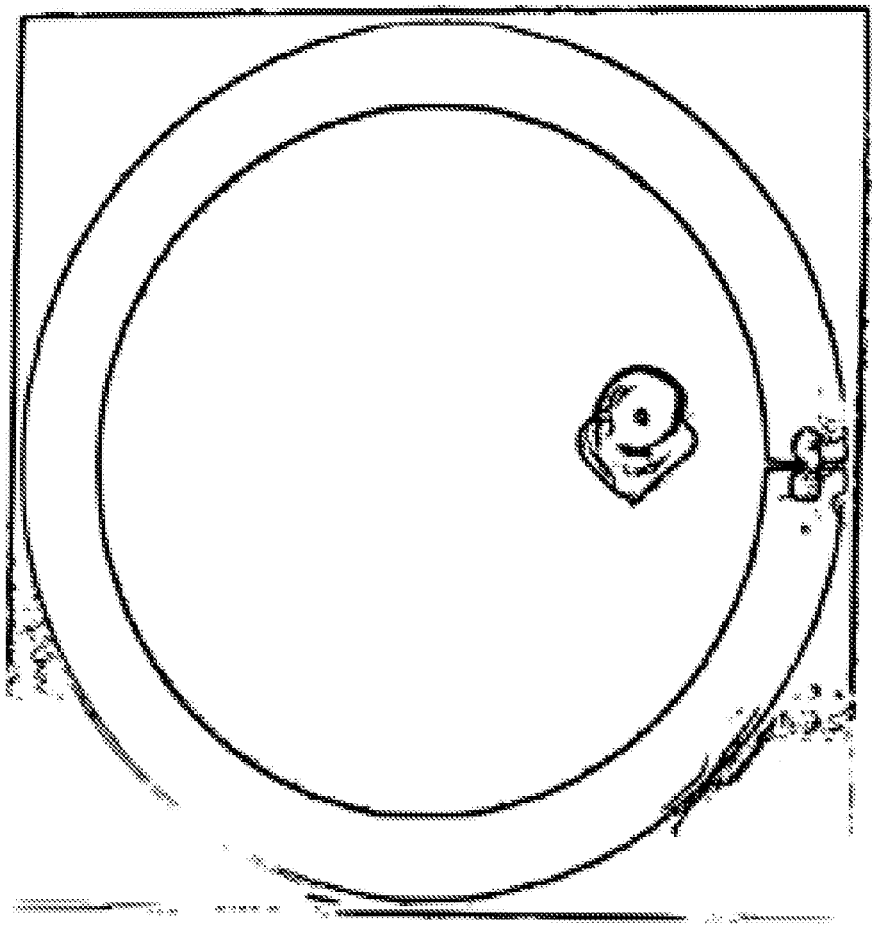
FIG. 9(b) shows a bottom view of a 12-layer exemplary transmitter or receiver of the wireless power and data transfer system according to an embodiment of the subject invention.

A top view and a bottom view of a 12-layer exemplary transmitter or receiver of the wireless power and data transfer system are shown in FIGS. 9(a) and 9(b), respectively.

Given the complexity of the resonance and capacitance associated with the transmitter and the receiver, the design of the wireless power and data transfer system is facilitated by simulations.

Figure 10:
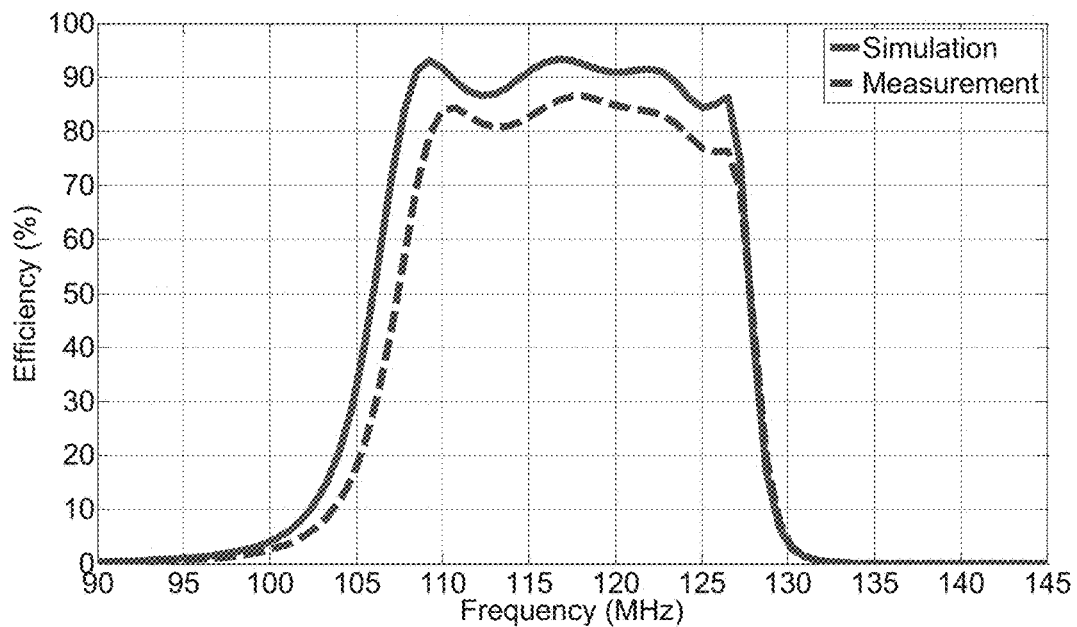
FIG. 10 is a graph illustrating simulated efficiencies as a function of operating frequencies and measured efficiencies as a function of operating frequencies of a conformal strongly coupled magnetic resonance (CSCMR) wireless power and data transfer system according to an embodiment of the subject invention.

FIG. 10 shows a graph illustrating simulated efficiencies as a function of the operating frequencies in comparison with measured efficiencies as a function of the operating frequencies of a conformal strongly coupled magnetic resonance (CSCMR) wireless power and data transfer system, according to an embodiment of the subject invention.

This embodiment employed the following parameters: the radius r1 of the inner source/load loop=14 mm; the radius r2 of the first outer loop of the transmitter/receiver resonator element=20 mm; the radius r3 of the second outer loop of the transmitter/receiver resonator element=50 mm; the cross-sectional width of the second outer loop of the transmitter/receiver resonator element=4.8 mm; a distance d between the transmitter and the receiver=50 mm; the capacitance of the first outer loop of the transmitter/receiver resonator element=31 pf, the capacitance of the second outer loop of the transmitter/receiver resonator element=7.6 pf; and the center operating frequency=117 MHz. Many other combinations of source/load elements and resonator elements are possible.

Referring to FIG. 10, it is noted that the measurement results agree very well with the simulation results and relatively constant efficiencies (between 80% and 90%) are accomplished over a span of operating frequency from 106 MHz to 128 MHz. The simulation results show a peak efficiency of 87% with an operating frequency of 117 MHz. In comparison, the measurement results show a peak efficiency of 94% with an operating frequency of 117 MHz.

Figure 11:
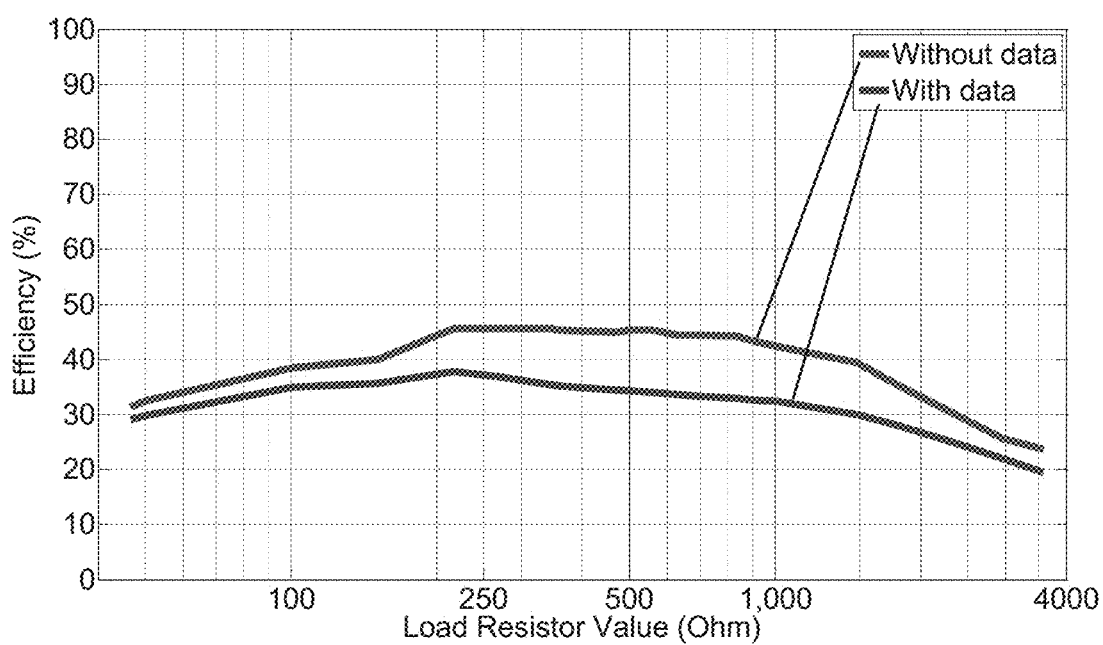
FIG. 11 is a graph illustrating efficiencies of the wireless power and data transfer system as a function of load resistances when data are transferred and when no data are transferred, respectively, according to an embodiment of the subject invention.

FIG. 11 shows a graph illustrating relationships between load resistances and efficiencies of the wireless power and data transfer system when data are transferred and when no data are transferred, respectively, according to an embodiment of the subject invention. Power conversion efficiency ranging between about 20% and about 38% is achieved, when data is transmitted; while the power conversion efficiency is increased to a range between about 25% and about 46%, when no data are transmitted. The efficiencies are calculated taking into account all losses from the system including SCMR loss, RF-to-DC loss and cable loss.

Figure 12A:
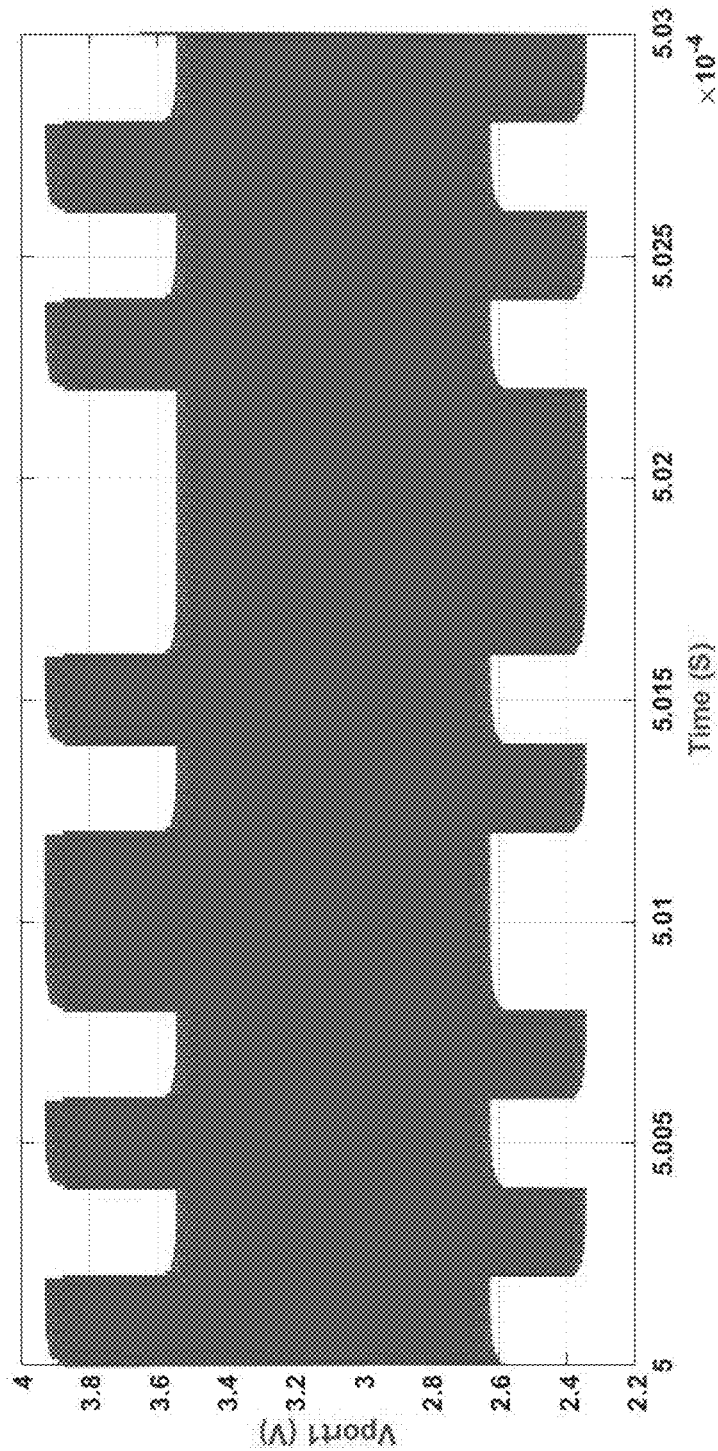
FIGS. 12 (a) and (b) show graphs illustrating relationships between vport1 versus time and envelope voltage versus time, respectively; when data are wirelessly transferred at a rate of about 10 Mb/sec, according to an embodiment of the subject invention.
Figure 12B:
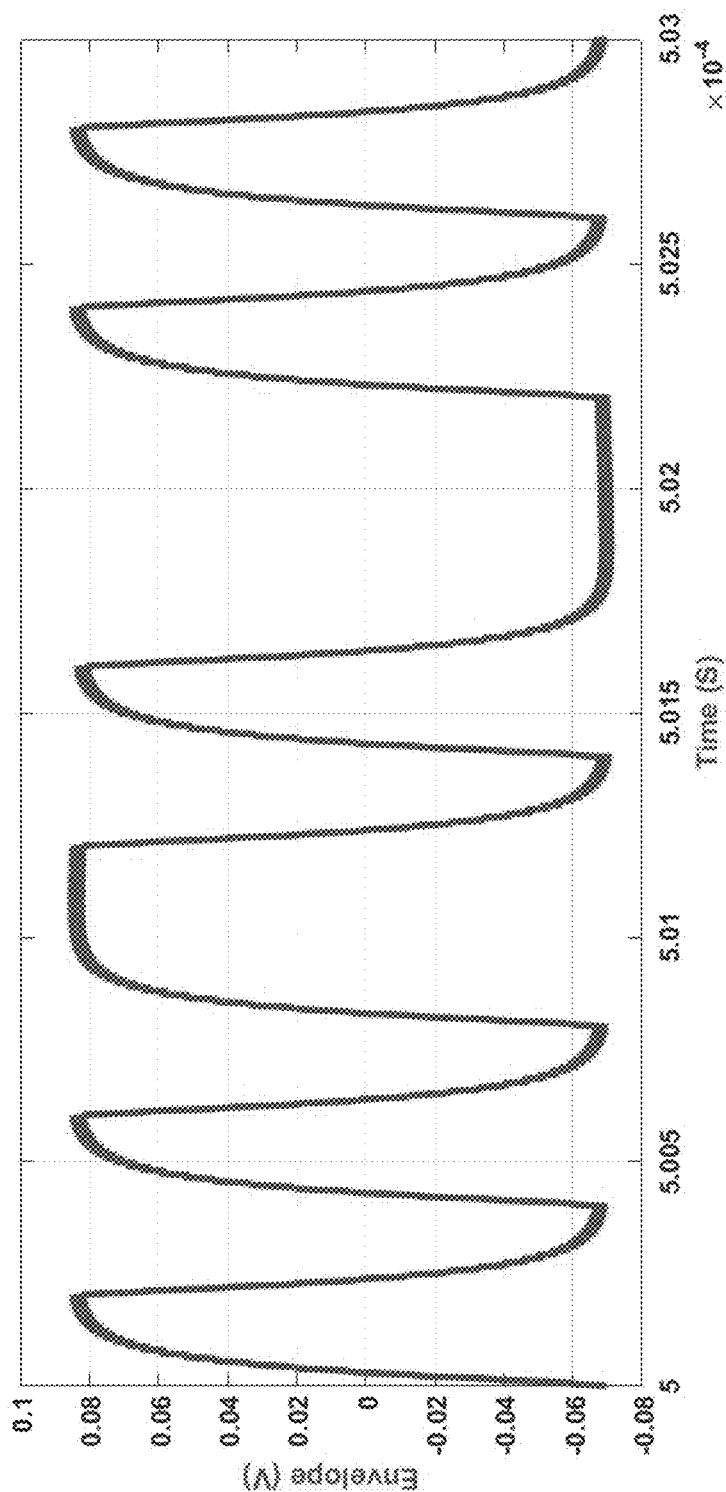

FIGS. 12 (a) and (b) show graphs illustrating relationships between a voltage vport1 versus time and envelope voltage versus time, respectively, at a data transfer rate of about 10 Mb/sec, according to an embodiment of the subject invention.

Figure 13:
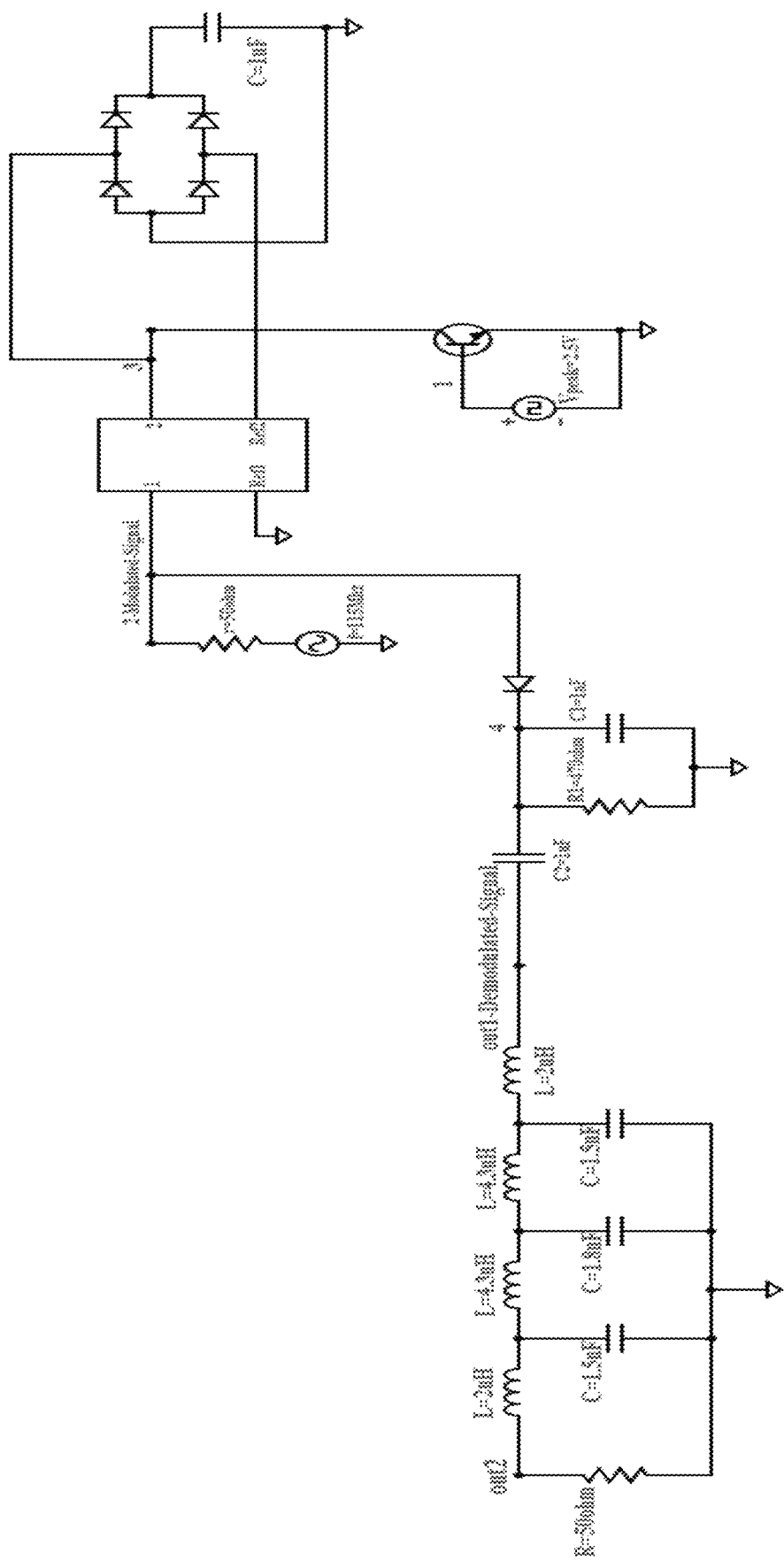
FIG. 13 is a schematic diagram of modulation and demodulation circuits of the wireless power and data transfer system according to an embodiment of the subject invention.

FIG. 13 shows a schematic diagram of modulation and demodulation circuits of the wireless power and data transfer system according to an embodiment of the subject invention.

Figure 14:
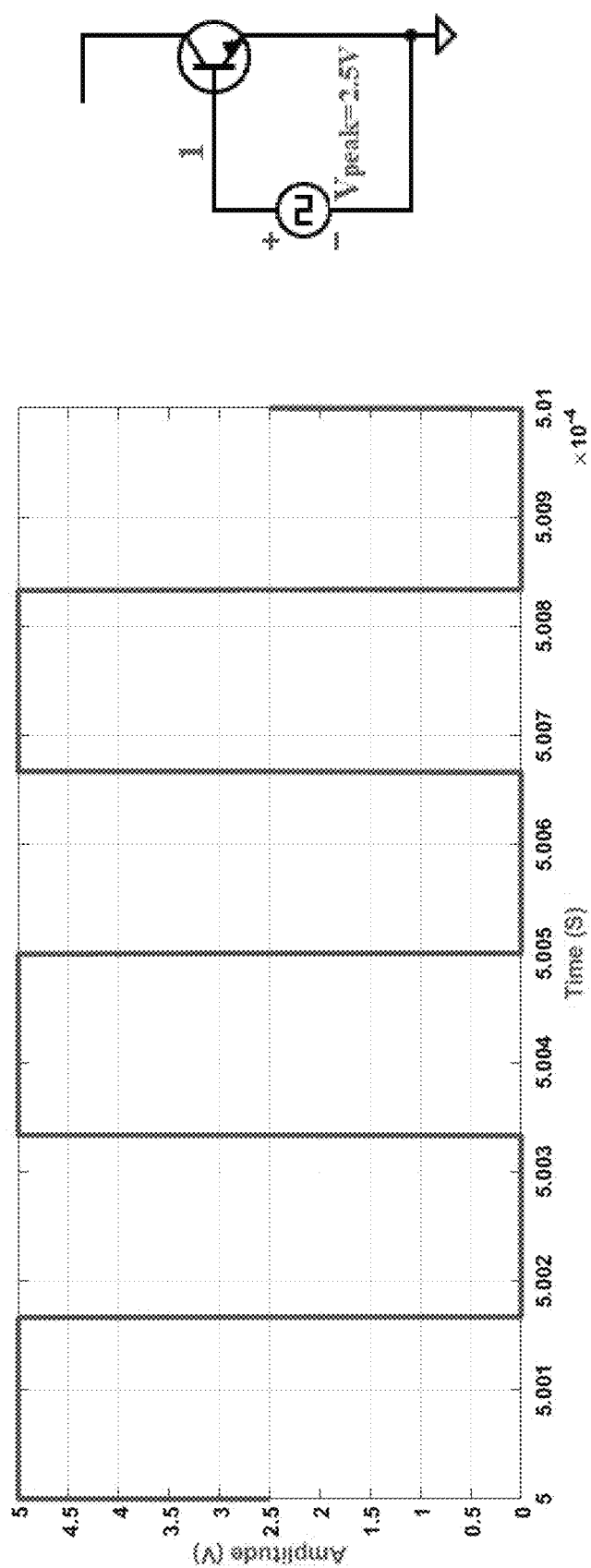
FIG. 14 shows a schematic diagram of square wave circuits of the modulation and demodulation circuits and a graph illustrating square waveforms generated according to an embodiment of the subject invention.

FIG. 14 shows a schematic diagram of square wave circuits of the modulation and demodulation circuits and a graph illustrating square waveforms generated according to an embodiment of the subject invention.

Figure 15:
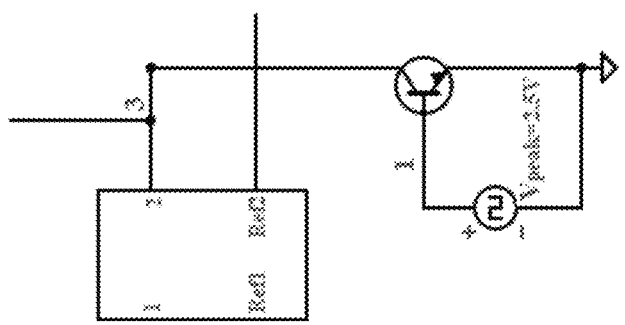
FIG. 15 shows a schematic diagram of a bipolar junction transistor (BJT) of the modulation and demodulation circuits and a graph illustrating the waveforms after passing the bipolar junction transistor (BJT) according to an embodiment of the subject invention.
Figure 15:
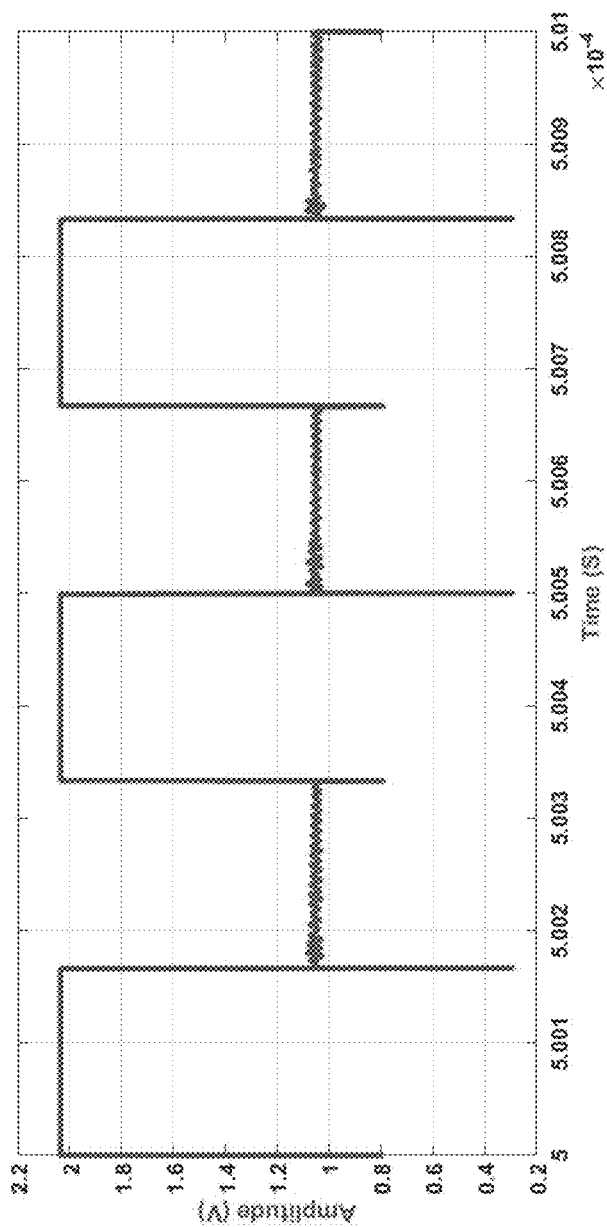

FIG. 15 shows a schematic diagram of a bipolar junction transistor (BJT) of the modulation and demodulation circuits and a graph illustrating the waveforms after passing the bipolar junction transistor (BJT) according to an embodiment of the subject invention.

Figure 16:
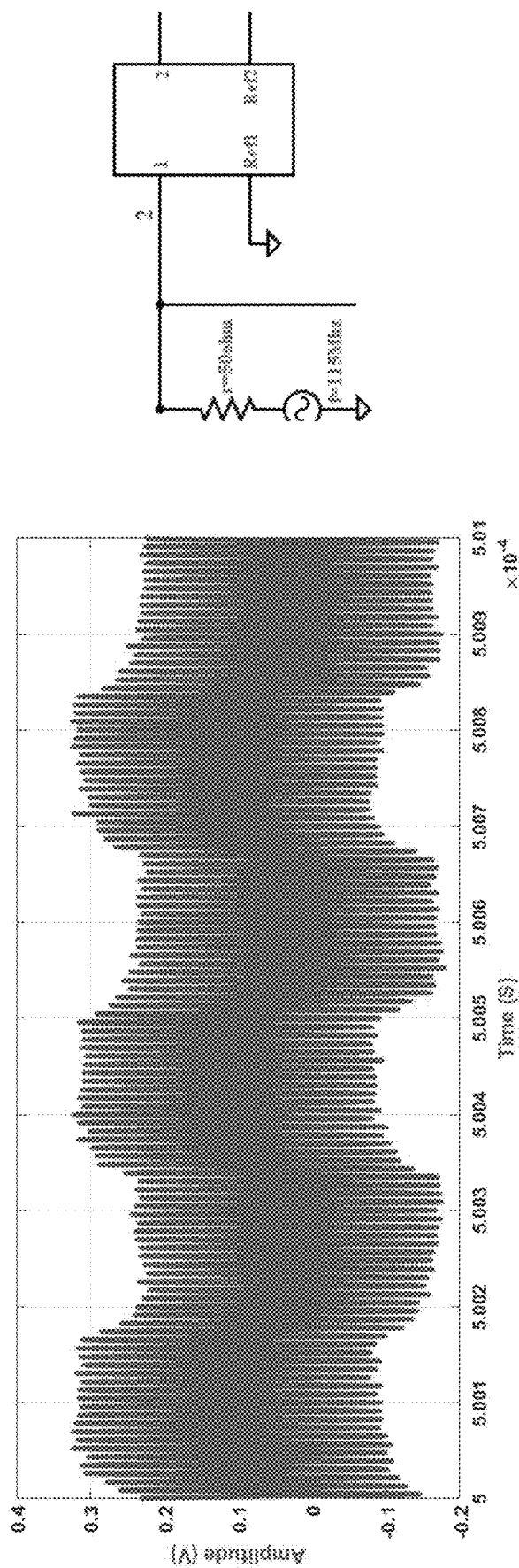
FIG. 16 shows a schematic diagram of modulation circuits of the modulation and demodulation circuits and a graph illustrating the waveforms after modulation according to an embodiment of the subject invention.

FIG. 16 shows a schematic diagram of modulation circuits of the modulation and demodulation circuits and a graph illustrating the waveforms after modulation according to an embodiment of the subject invention.

Figure 17:
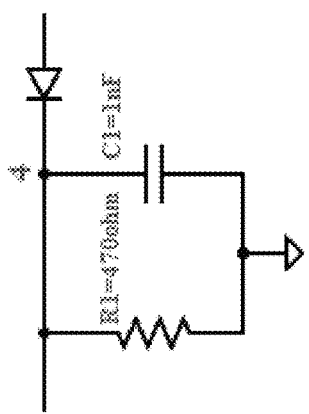
FIG. 17 shows a schematic diagram of a diode of the modulation and demodulation circuits and a graph illustrating the waveforms after passing the diode according to an embodiment of the subject invention.
Figure 17:
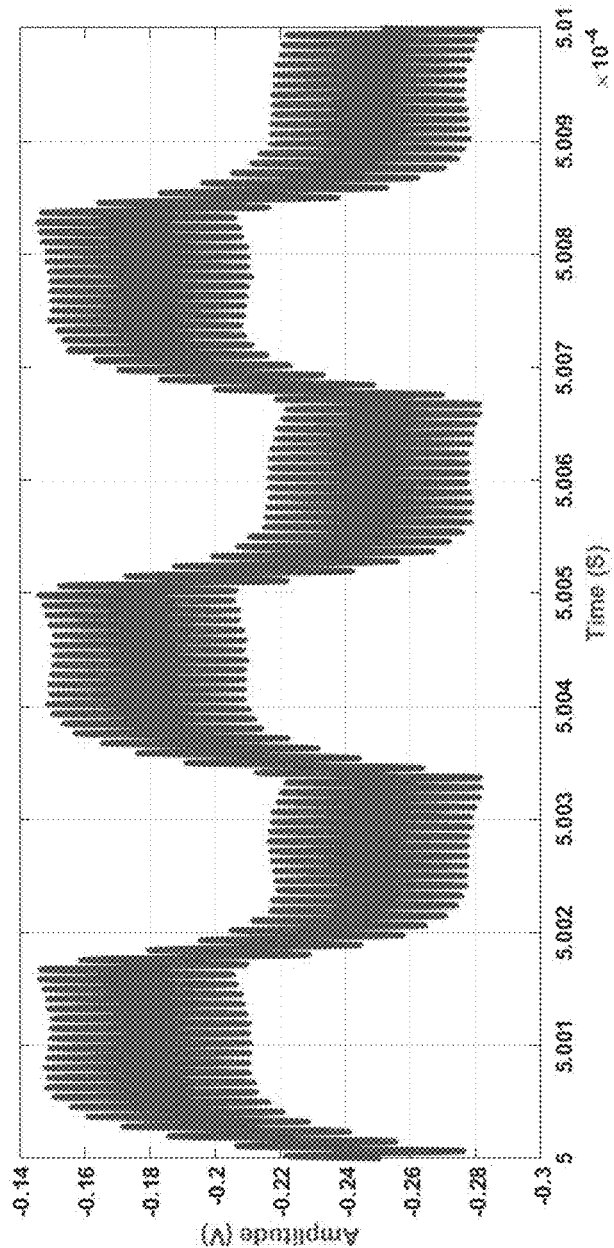

FIG. 17 shows a schematic diagram of a diode of the modulation and demodulation circuits and a graph illustrating the waveforms after passing the diode according to an embodiment of the subject invention.

Figure 18:
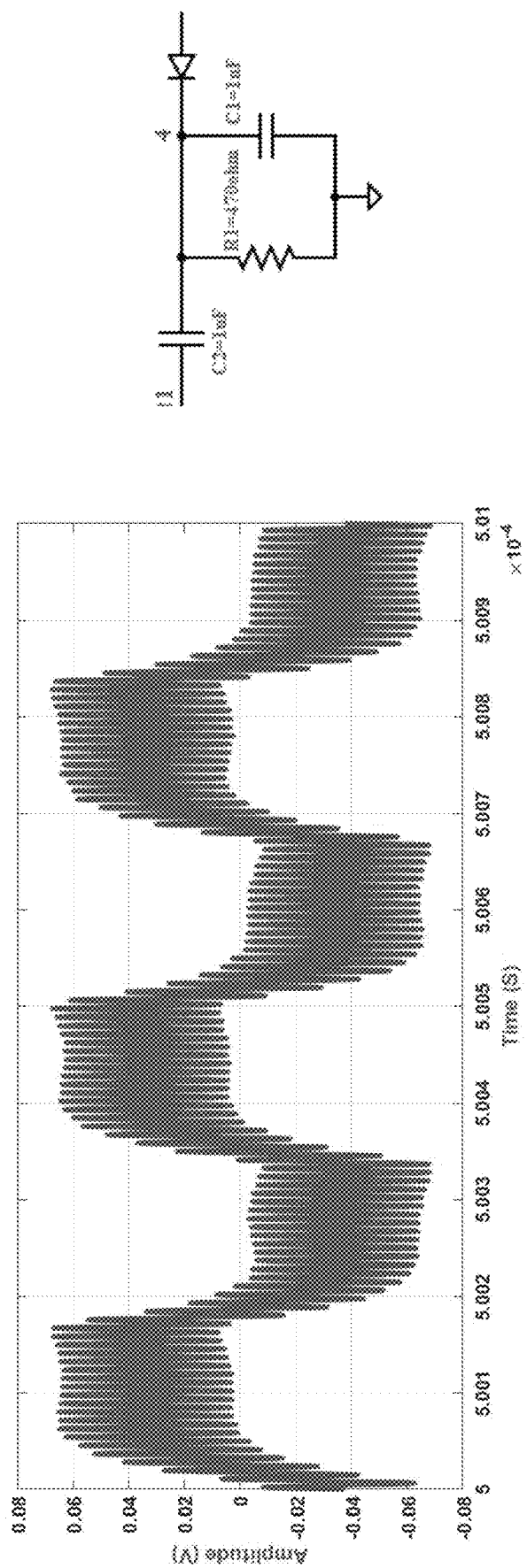
FIG. 18 shows a schematic diagram of a C2-DC block of the modulation and demodulation circuits and a graph illustrating the demodulated waveforms after passing the C2-DC block according to an embodiment of the subject invention.

FIG. 18 shows a schematic diagram of a C2-DC block of the modulation and demodulation circuits and a graph illustrating the demodulated waveforms after passing the C2-DC block according to an embodiment of the subject invention.

Figure 19:
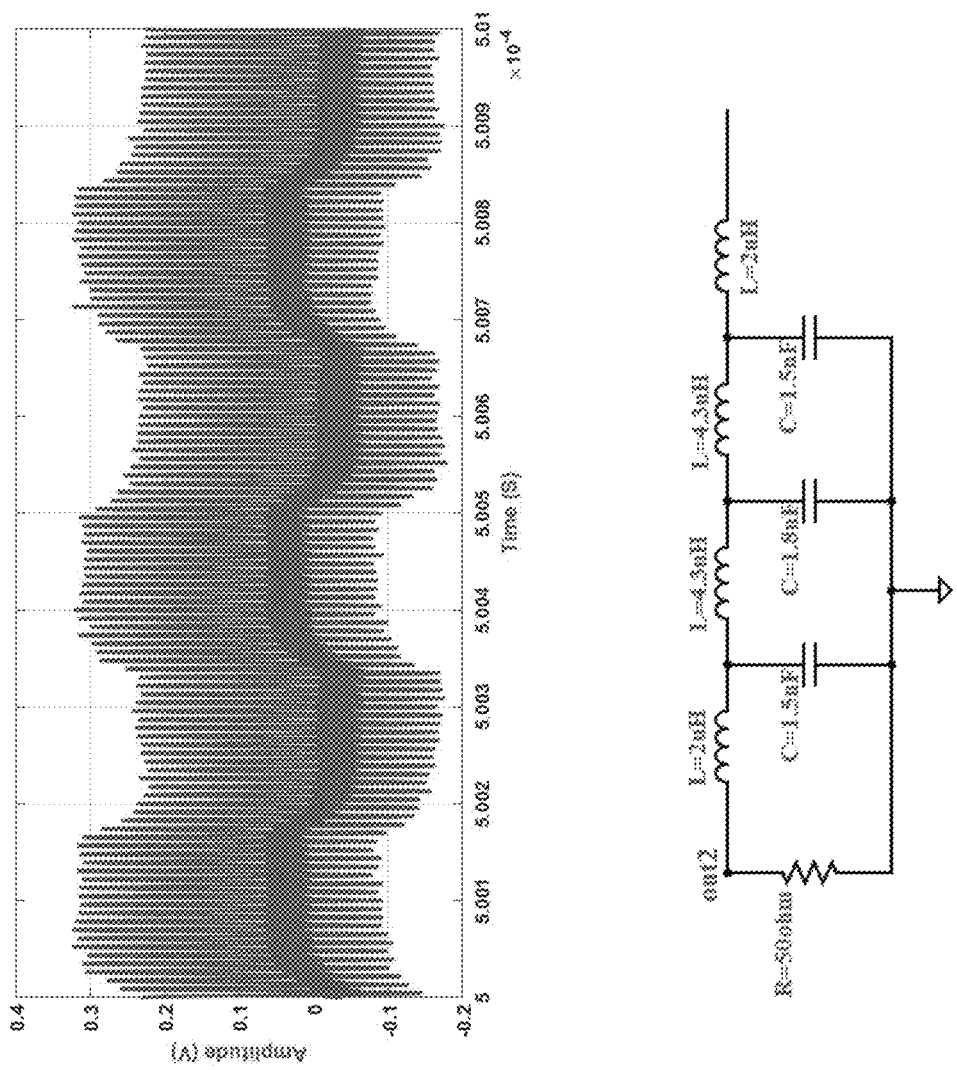
FIG. 19 is a graph illustrating a comparison between demodulated waveforms and modulated waveforms according to an embodiment of the subject invention.

FIG. 19 is a graph illustrating a comparison between demodulated waveforms and modulated waveforms according to an embodiment of the subject invention.

Figure 20:
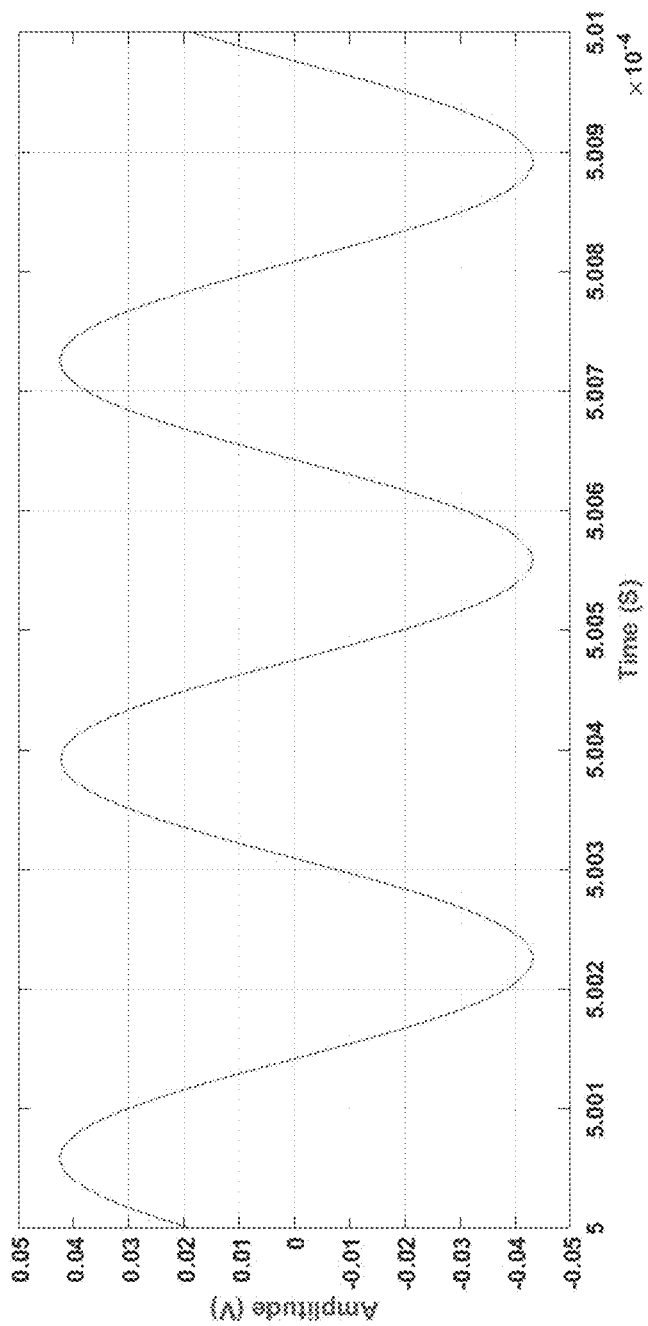
FIG. 20 shows a schematic diagram of a $7^{th}$ order low-pass filter (LPF) of Chebyshev type of the modulation and demodulation circuits and a graph illustrating the waveforms after passing the LPF of Chebyshev type according to an embodiment of the subject invention.

FIG. 20 shows a schematic diagram of a $7^{th}$ order low-pass filter (LPF) of Chebyshev type of the modulation and demodulation circuits and a graph illustrating the waveforms after passing the LPF of Chebyshev type, according to an embodiment of the subject invention.

Figure 21:
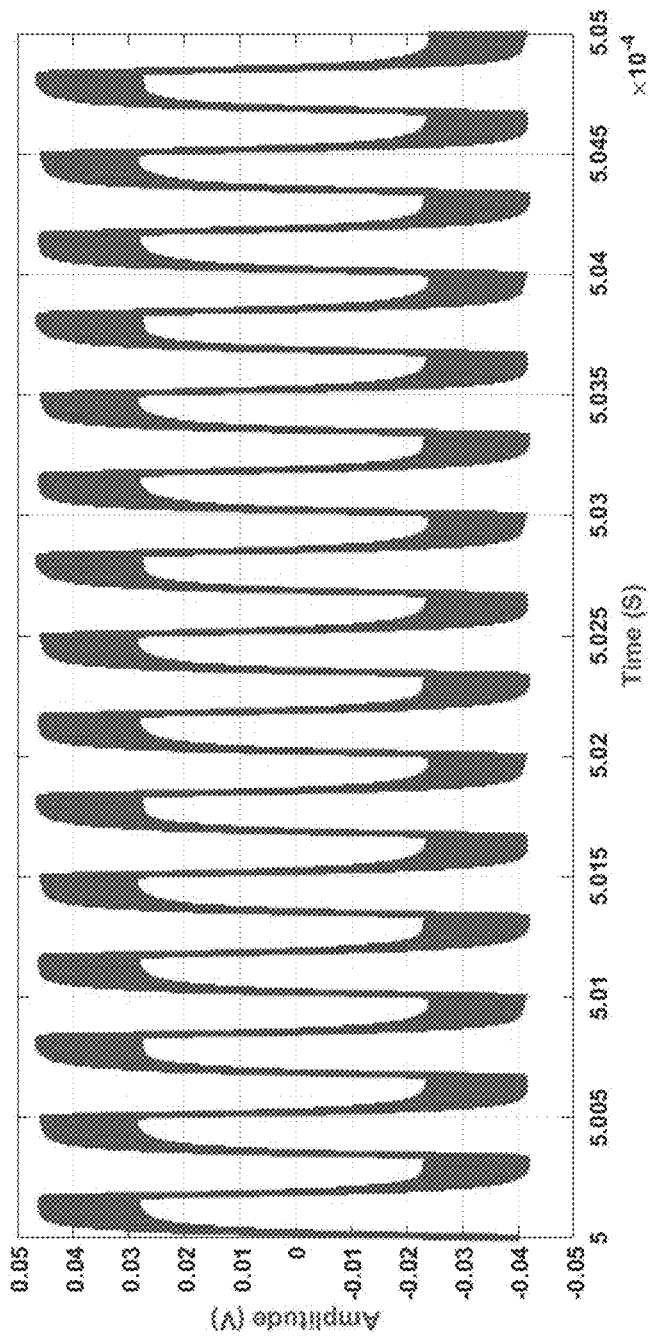
FIG. 21 shows a schematic diagram of a $7^{th}$ order LPF of Butterworth type of the modulation and demodulation circuits and a graph illustrating the waveforms after passing the $7^{th}$ order LPF of Butterworth type according to an embodiment of the subject invention.

FIG. 21 shows a schematic diagram of a $7^{th}$ order LPF of Butterworth type of the modulation and demodulation circuits and a graph illustrating the waveforms after passing the $7^{th}$ order LPF of Butterworth type, according to an embodiment of the subject invention.

Figure 22:
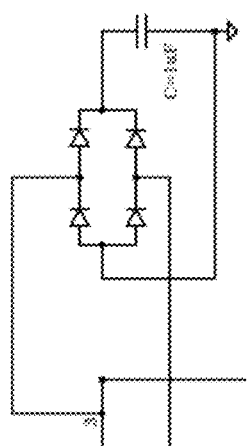
FIG. 22 shows a schematic diagram of DC generator circuits of the wireless power and data transfer system and a graph illustrating the generated DC Level versus time according to an embodiment of the subject invention.
Figure 22:
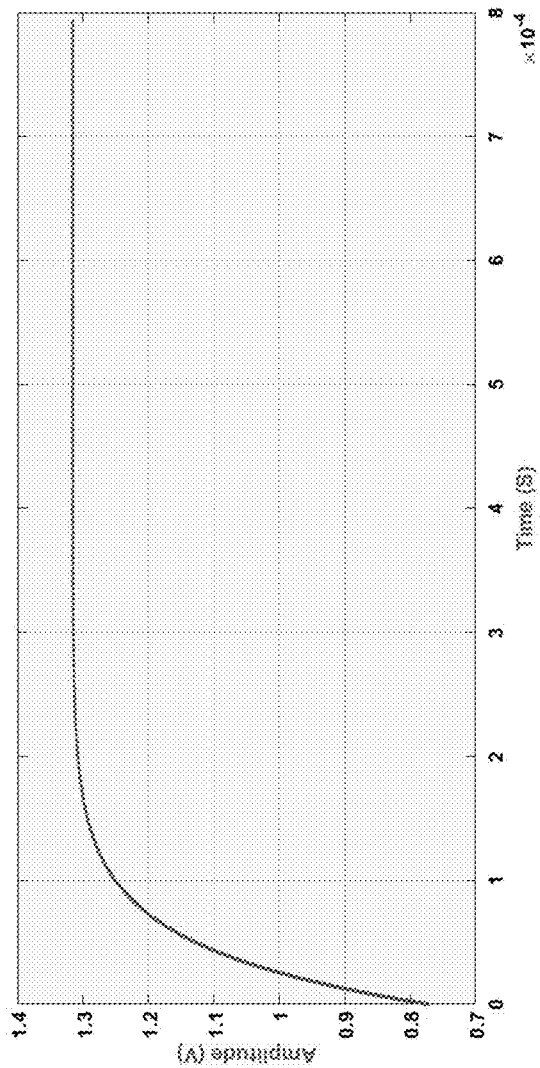

FIG. 22 shows a schematic diagram of DC generator circuits of the wireless power and data transfer system and a graph illustrating the generated DC Level versus time, according to an embodiment of the subject invention. The DC power generated is at a level of about 1.32 V.

Figure 23:
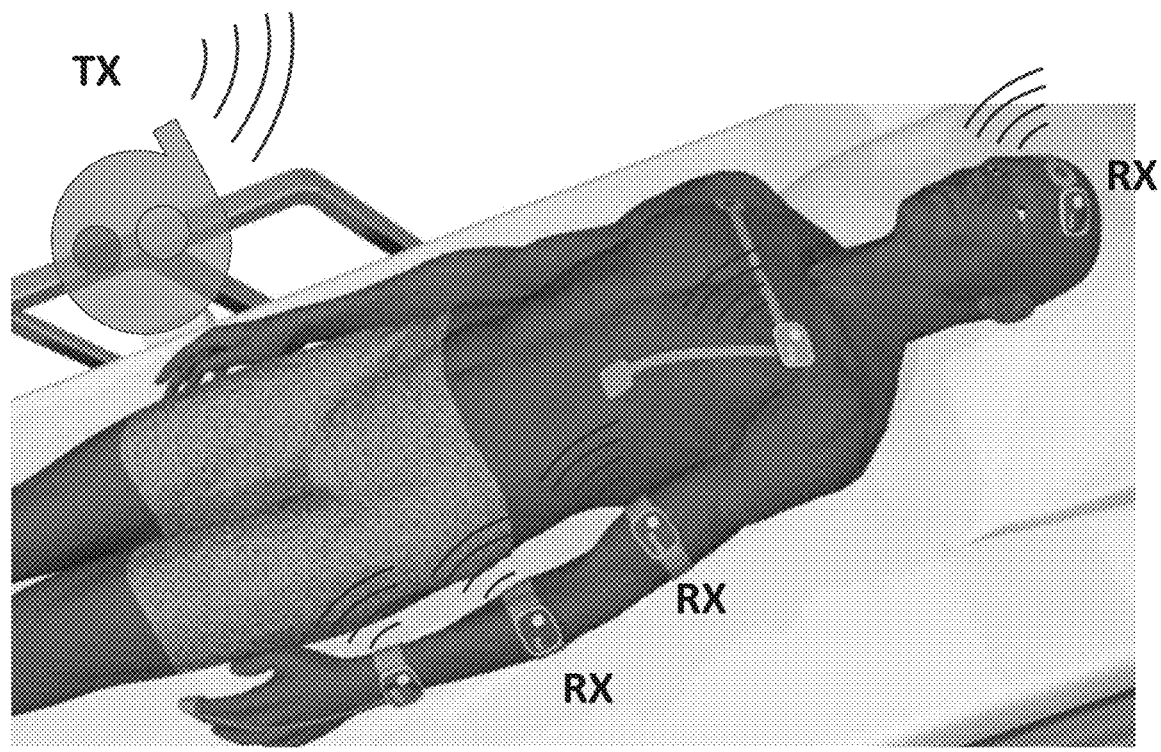
FIG. 23 illustrates the wireless power and data transfer system wearable on a human body for health care sensing according to an embodiment of the subject invention.

FIG. 23 illustrates an image displaying the wireless power and data transfer system wearable on a human body for health care sensing according to an embodiment of the subject invention. In particular, the wearable receiver RX can be worn on the arm or head of a patient and the wearable receivers can be coupled to a planar transmitter, as shown.

Figure 24:
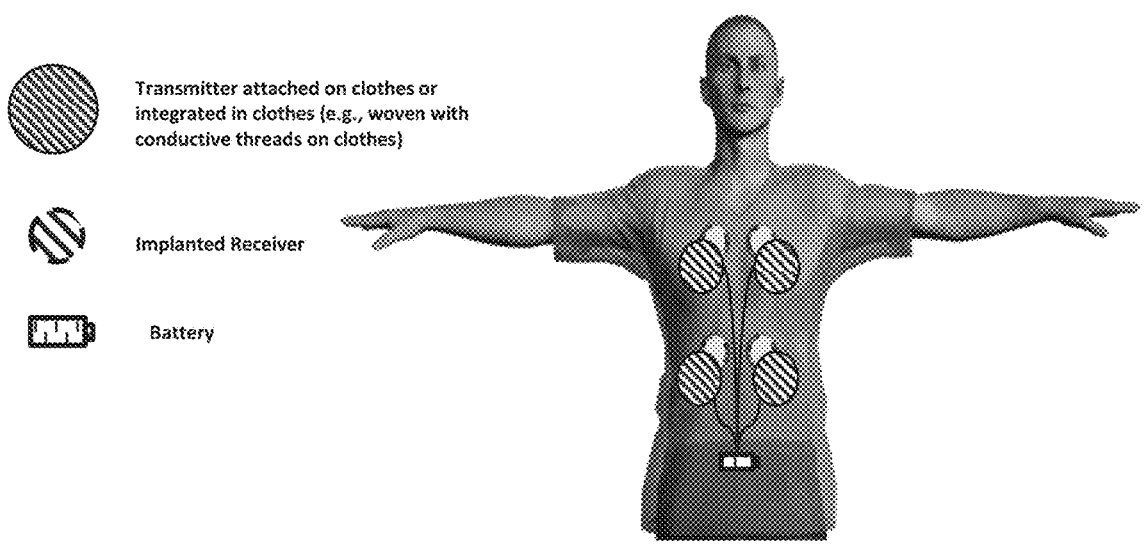
FIG. 24 illustrates the wireless power and data transfer system having wearable sensors and devices according to an embodiment of the subject invention.

FIG. 24 illustrates the wireless power and data transfer system having wearable sensors and devices according to an embodiment of the subject invention. In particular, the receiver of the system may be implanted into the human body and the transmitter may be powered by a battery and attached on skin or clothes or integrated in clothes by being woven with conductive threads on clothes.

Figure 25:
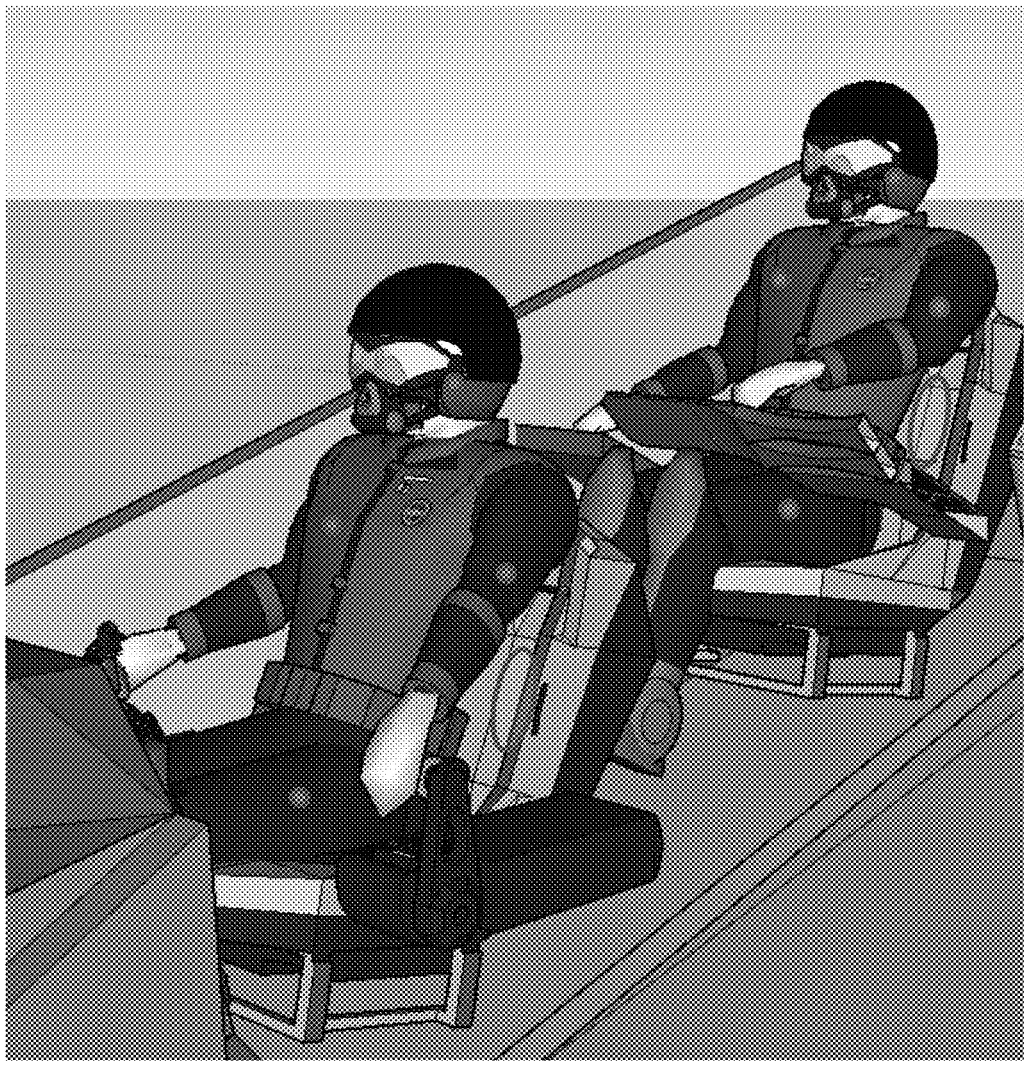
FIG. 25 illustrates the strongly coupled magnetic resonance (SCMR) wireless power and data transfer system wearable on a human body for communication or for health monitoring according to an embodiment of the subject invention.

FIG. 25 illustrates the strongly coupled magnetic resonance (SCMR) wireless power and data transfer system that is wearable on a human body for communication or for health monitoring according to an embodiment of the subject invention.

Figure 26:
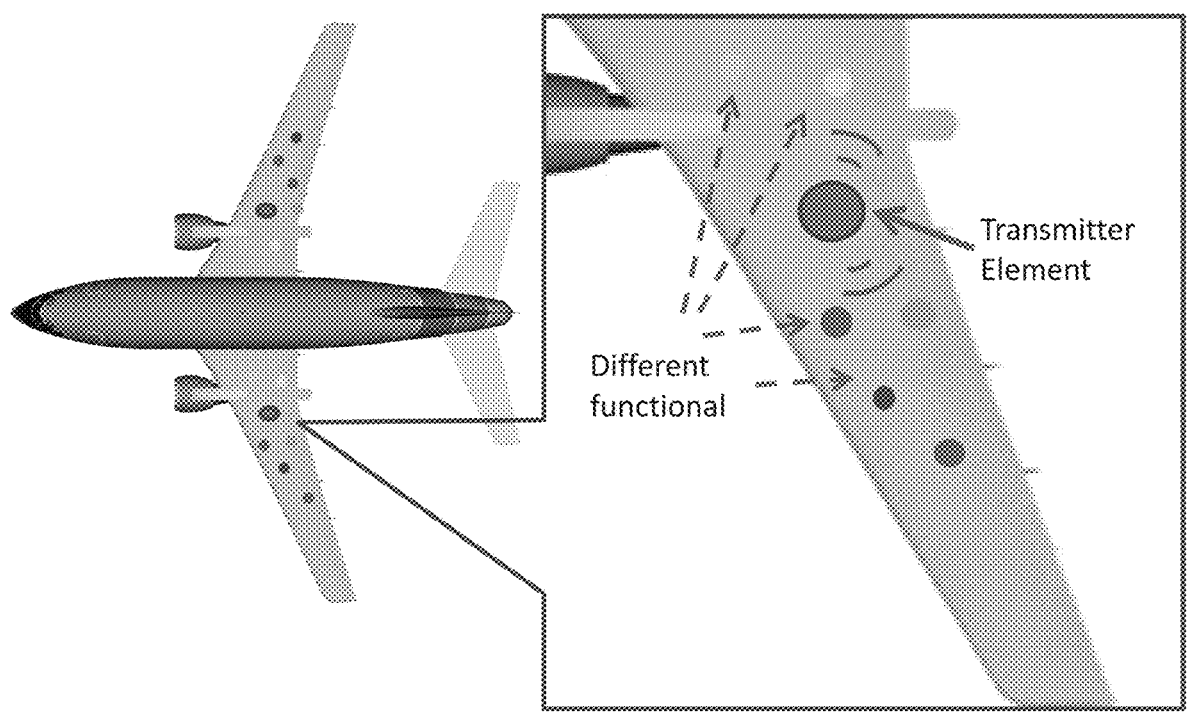
FIG. 26 illustrates the wireless power and data transfer system for structural condition monitoring according to an embodiment of the subject invention.

FIG. 26 illustrates the wireless power and data transfer system for structural conditions monitoring according to an embodiment of the subject invention. In particular, the receivers of the system may include different types of functional sensors that can be disposed at various locations of an aircraft for monitoring the structural conditions of the aircraft.

Figure 27:
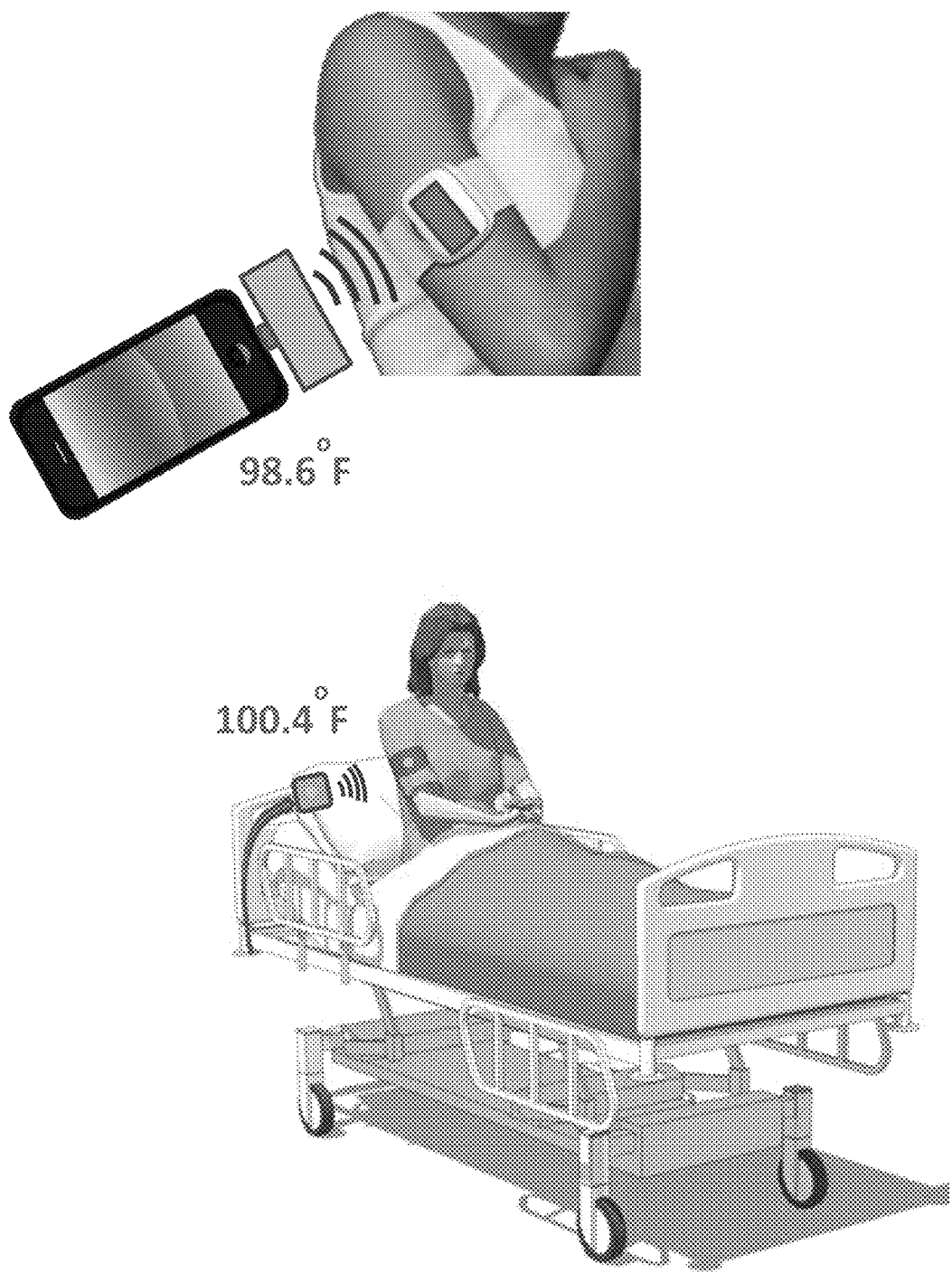
FIG. 27 illustrates the wireless power and data transfer system used in a wearable battery-free thermometer according to an embodiment of the subject invention. In particular, the power transmitter may be attached to a patient's bed, gurney, or wheelchair. For example, the transmitter and the receiver can be spaced apart from each other by a distance between 1 inch and 1 foot.

FIG. 27 illustrates the wireless power and data transfer system used in a wearable battery-free thermometer according to an embodiment of the subject invention. In particular, the power transmitter may be attached to a patient's bed, gurney, or wheelchair. For example, the transmitter and the receiver can be spaced apart from each other by a distance between 1 inch and 1 foot.

Figure 28:
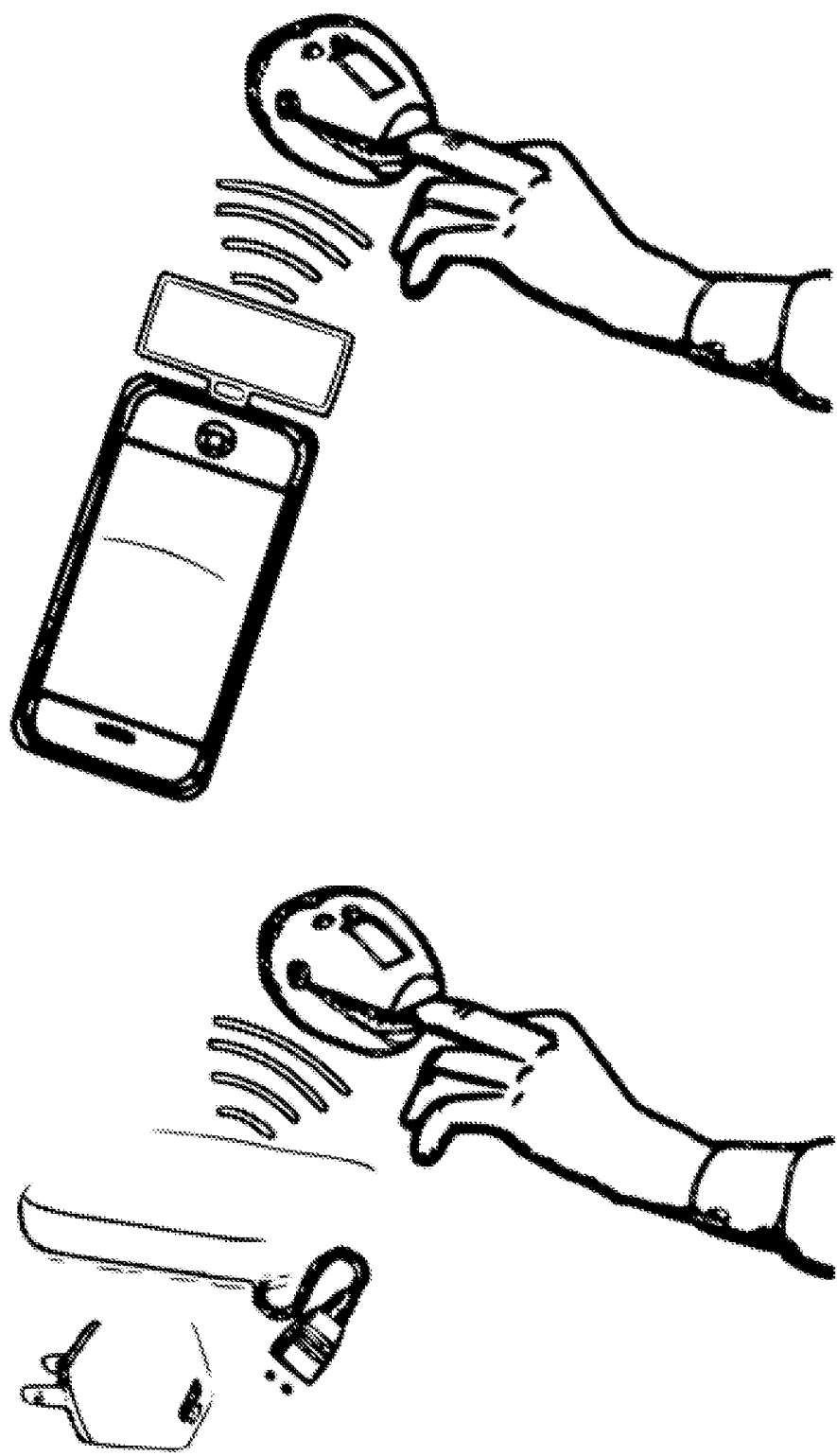
FIG. 28 illustrates the wireless power and data transfer system used in a wearable battery-free thermometer according to an embodiment of the subject invention.

FIG. 28 illustrates the wireless power and data transfer system used in a battery-free pulse oximeter according to an embodiment of the subject invention. In particular, the wireless power and data transfer system may monitor peripheral capillary oxygen saturation (% $SpO_2$) or pulse rate of a patient.

Figure 29:
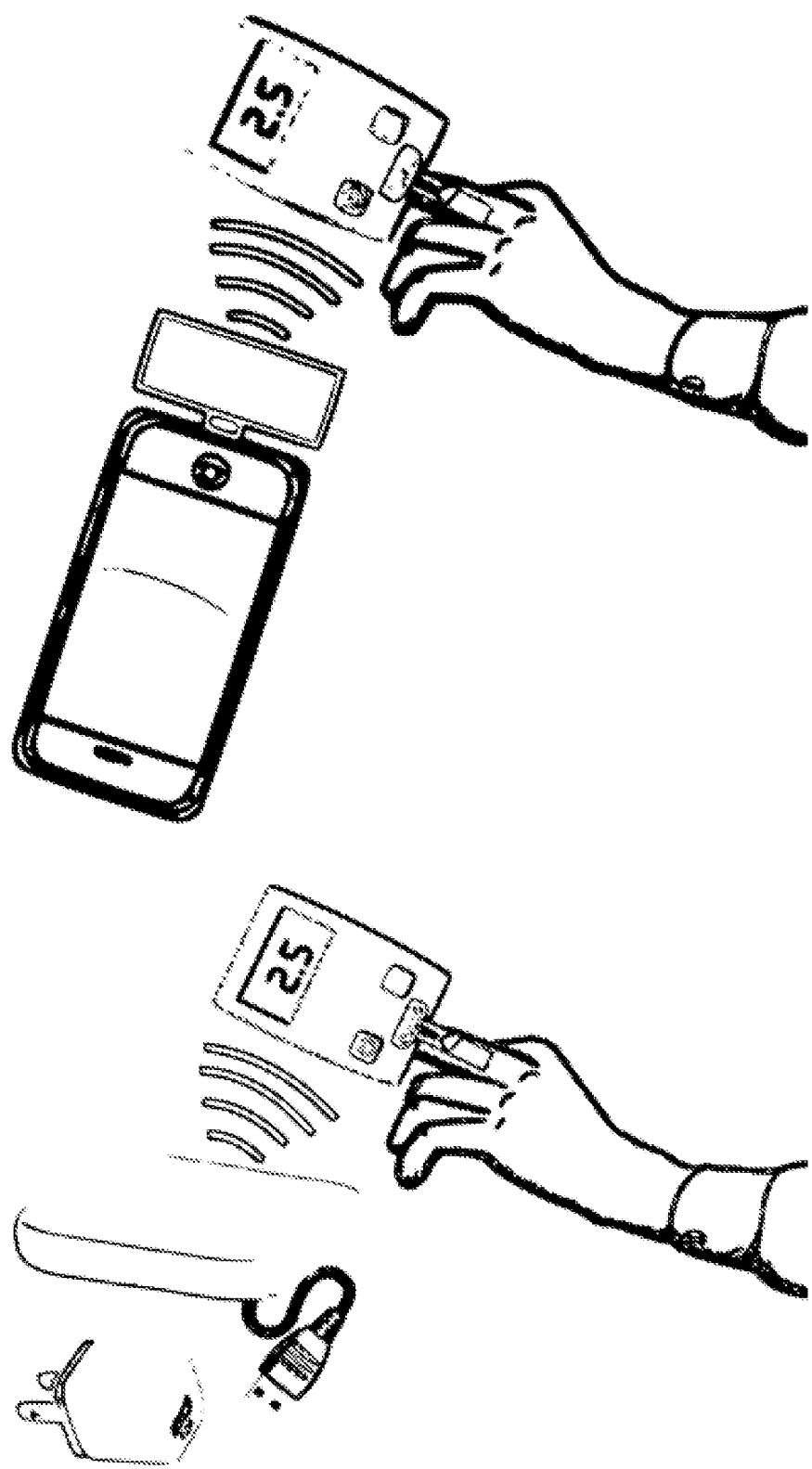
FIG. 29 illustrates the wireless power and data transfer system used in a battery-free pulse oximeter according to an embodiment of the subject invention.

FIG. 29 illustrates the wireless power and data transfer system used in a battery-free glucose monitor according to an embodiment of the subject invention.

Figure 30:
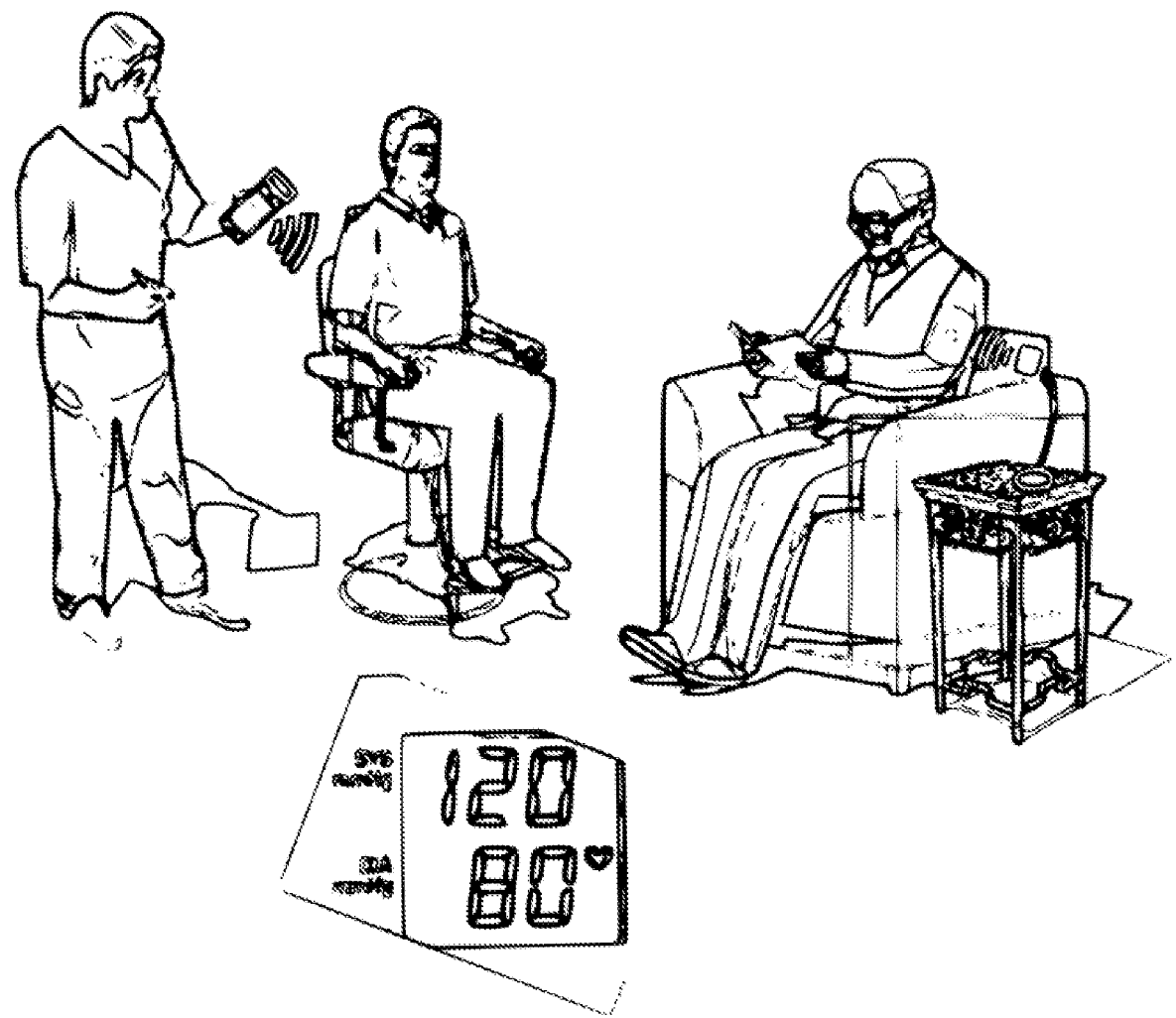
FIG. 30 illustrates the wireless power and data transfer system used in a battery-free arm blood pressure monitor according to an embodiment of the subject invention.

FIG. 30 illustrates the wireless power and data transfer system used in a battery-free arm blood pressure monitor according to an embodiment of the subject invention.

Figure 31:
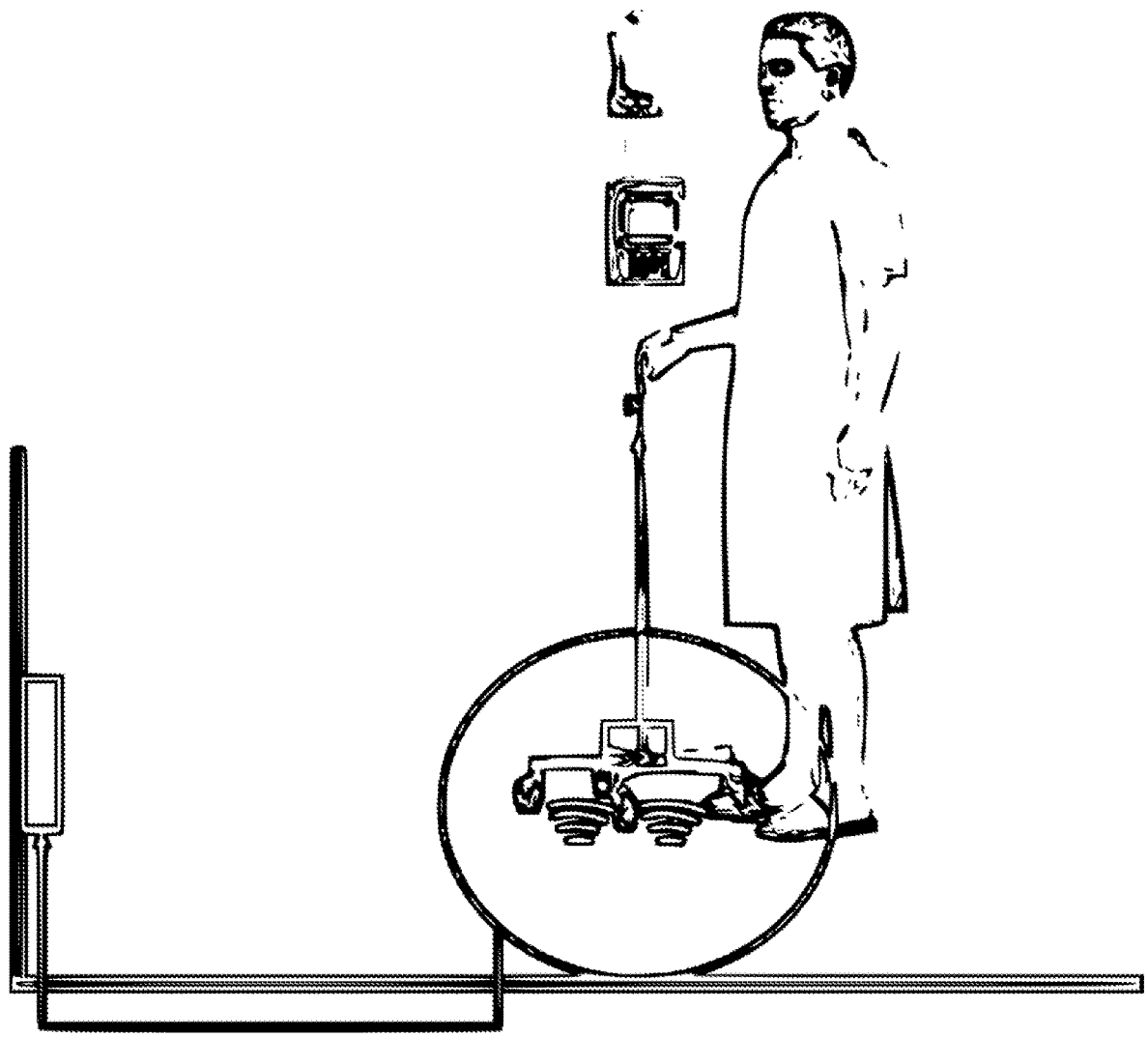
FIG. 31 illustrates the wireless power and data transfer system used in a wirelessly powered/charged IV pump with uploading/downloading data according to an embodiment of the subject invention.

FIG. 31 illustrates the wireless power and data transfer system used in a wirelessly powered/charged IV pump with uploading/downloading data according to an embodiment of the subject invention. In particular, the wireless power and data transfer system may include a charging and powering mat and a data collecting/transmitting mat.

Figure 32:
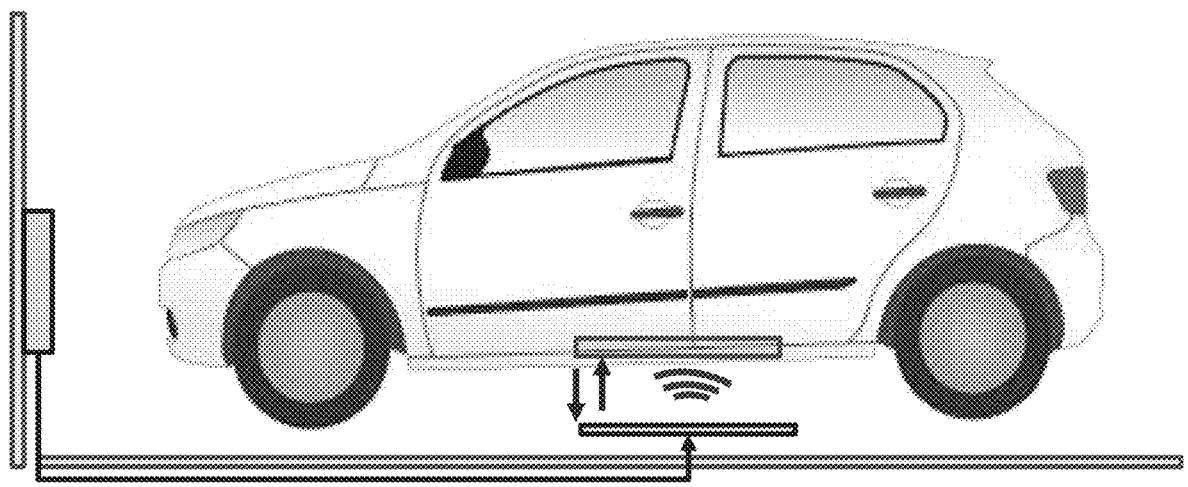
FIG. 32 illustrates the wireless power and data transfer system used in a car charging and downloading/uploading data according to an embodiment of the subject invention.

FIG. 32 illustrates the wireless power and data transfer system used in a car charging and downloading/uploading data according to an embodiment of the subject invention. In particular, the wireless power and data transfer system may charge batteries of an electric car while collecting data from or transmitting data to the electric car at the same time.

Figure 33:
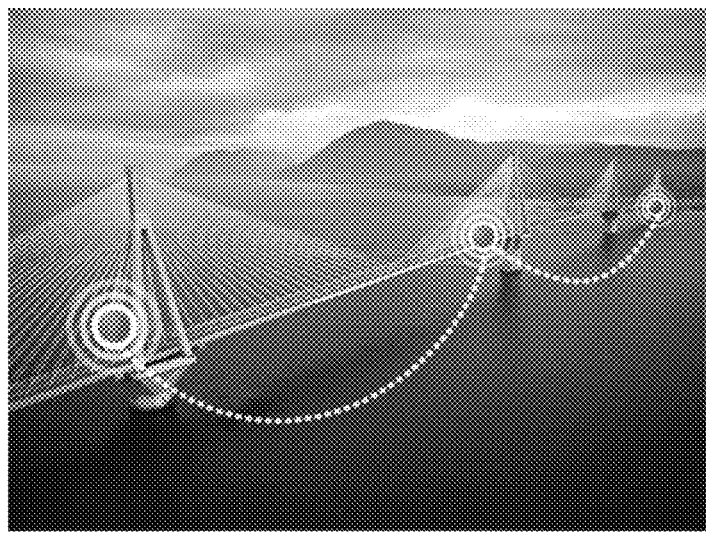
FIG. 33 illustrates the wireless power and data transfer system for structural condition monitoring according to an embodiment of the subject invention.
Figure 33:
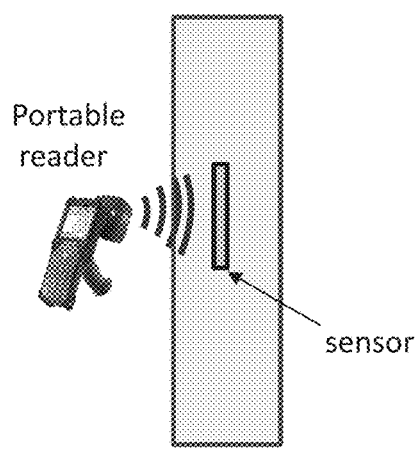
Figure 33:
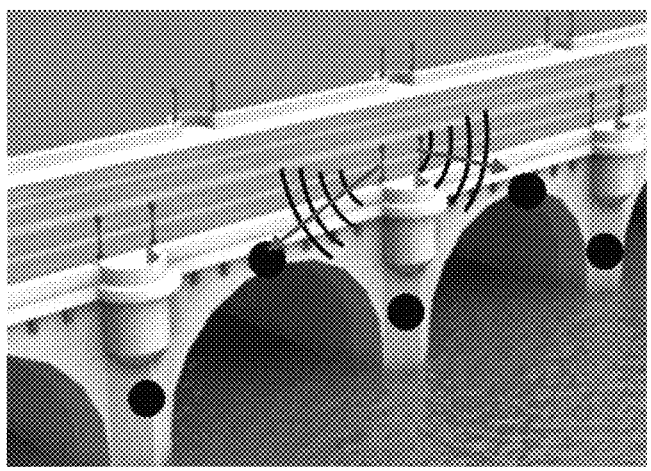

FIG. 33 illustrates the wireless power and data transfer system for structural condition monitoring according to an embodiment of the subject invention. In particular, the wireless power and data transfer system may include a portable reader and sensors disposed on a bridge to collect and transmit data concerning the structural heath of the bridge, while powering/charging the sensors.

Figure 34:
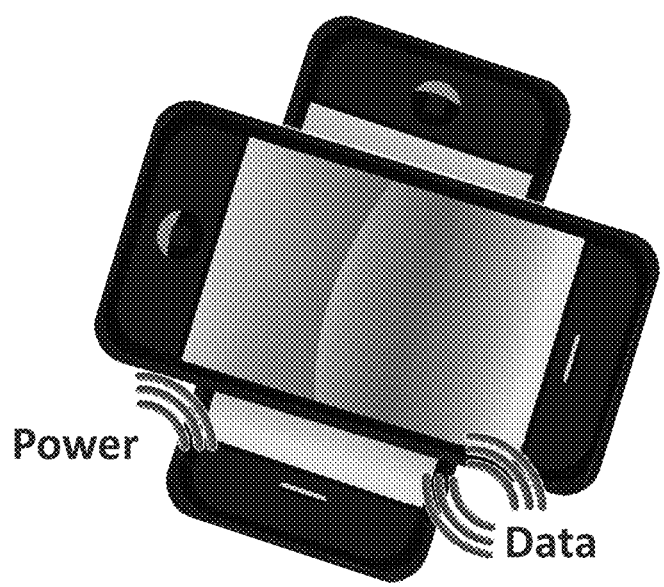
FIG. 34 illustrates the wireless power and data transfer system for transferring power and data between smartphones according to an embodiment of the subject invention.

FIG. 34 illustrates a wireless power and data transfer system for transferring power and data between smartphones according to an embodiment of the subject invention. For example, at least two smartphones can simultaneously share power and data between each other.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A wireless power and data transfer system, comprising:
a transmitter (TX) device; and
a receiver (RX) device;
the TX device comprising:
  a signal converter; and
  a transmitter element wirelessly coupled to the RX device, in order to wirelessly transmit power or data to the RX device and wirelessly receive data from the RX device, the received data being provided to the signal converter,
the signal converter being coupled to the transmitter element, in order to convert the data provided by the transmitter element for output,
the RX device comprising:
  a power converter;
  at least one sensor element;
  a signal modulator; and
  a receiver element wirelessly coupled to the transmitter element of the TX device, in order to wirelessly receive the power or the data transmitted from the transmitter element of the TX device and wirelessly transmit the data to the transmitter element, the received power being provided to the power converter,
the power converter being coupled to the receiving element and the at least one sensor element, in order to convert the power provided by the receiver element and supply the converted power to the at least one sensor element;
the at least one sensor element being directly coupled to the signal modulator, in order to receive the converted power supplied by the power converter and acquire data, and to provide the acquired data directly to the signal modulator,
the signal modulator being coupled to the receiver element, in order to modulate the data provided by the at least one sensor element and provide the modulated data to the receiver element,
the transmitter element comprising:
  a transmitter substrate; a source element forming an inner loop on a source layer the transmitter substrate;
  a plurality of transmitter resonator elements each forming, an outer loop on a plurality of transmitter resonator layers, respectively, stacked on the transmitter substrate, and
  a plurality of transmitter capacitors connected to the plurality of transmitter resonator elements, respectively, and,
each transmitter resonator element of the plurality of transmitter resonator elements being electrically insulated from each other transmitter resonator element of plurality of transmitter resonator elements.

2. The wireless power and data transfer system according to claim 1, the TX device and the RX device being configured to transfer the power and the data with each other by a wireless near-field method such that the transfer is secure from devices external to the wireless power and data transfer system.

3. The wireless power and data transfer system according to claim 1, the RX device comprising a power storage element coupled to the sensor element and configured to be charged or recharged by the power received from the receiver element, the signal converter being an envelope detector, the power transferred between the TX device and the RX device being radio frequency (RF) power, and the signal modulator being a backscattering modulator.

4. The wireless power and data transfer system according to claim 1, the receiver element comprising:
  a receiver substrate;
  a load element forming an inner loop on a load layer on the receiver substrate;
  a plurality of receiver resonator elements each forming an outer loop on a plurality of receiver resonator lavers, respectively, stacked on the receiver substrate; and
  a plurality of receiver capacitors connected to the plurality of receiver resonator elements, respectively,
each receiver resonator element of the plurality of receiver resonator elements being electrically insulated from each other receiver resonator element of the plurality of receiver resonator elements.

5. The wireless power and data transfer system according to claim 4, the receiver substrate comprising a glass-reinforced epoxy laminate material, a flexible printed circuit board (PCB), a rigid PCB, a cloth, textile, or ceramic.

6. The wireless power and data transfer system according to claim 1, the transmitter substrate comprising glass-reinforced epoxy laminate material, a flexible printed circuit board (PCB), a rigid PCB, cloth, textile, or ceramic.

7. The wireless power and data transfer system according to claim 1, the transmitter element and the receiver element being disposed in parallel.

8. The wireless power and data transfer system according to claim 1, the at least one sensor element comprising an embedded sensor for monitoring structural health of a structure.

9. The wireless power and data transfer system according to claim 1, the at least one sensor element comprising at least one of an implantable sensor a wearable sensor, a soil sensor, and a water sensor.

* * * * *